United States Patent
Bigger et al.

(10) Patent No.: US 12,340,357 B1
(45) Date of Patent: Jun. 24, 2025

(54) IN-FACILITY ITEM PURCHASE

(71) Applicant: Amazon Technologies, Inc., Seattle, WA (US)

(72) Inventors: Shawn Bigger, Bellevue, WA (US); Yi Xiang, Seattle, WA (US); Kerry Ann McGuire, Seattle, WA (US); Caroline Hurd, Edmonds, WA (US); Raj Kumar, Redmond, WA (US); Kevin Kuehler, Seattle, WA (US); Steven Zheng, Saratoga, CA (US); Mustafa Majeed, Mill Creek, WA (US); Aarti Sundararajan, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 662 days.

(21) Appl. No.: 17/544,682

(22) Filed: Dec. 7, 2021

Related U.S. Application Data

(60) Provisional application No. 63/280,011, filed on Nov. 16, 2021.

(51) Int. Cl.
*G06Q 20/20* (2012.01)
*G06Q 20/08* (2012.01)
*G06Q 20/40* (2012.01)
*G06Q 30/0601* (2023.01)
*G07C 9/00* (2020.01)

(52) U.S. Cl.
CPC ......... *G06Q 20/203* (2013.01); *G06Q 20/085* (2013.01); *G06Q 20/207* (2013.01); *G06Q 20/4014* (2013.01); *G06Q 30/0633* (2013.01); *G07C 9/00* (2013.01)

(58) Field of Classification Search
CPC .. G06Q 20/203; G06Q 20/085; G06Q 20/207; G06Q 20/4014; G06Q 30/0633; G07C 9/00

See application file for complete search history.

(56) References Cited

U.S. PATENT DOCUMENTS

| | | | | |
|---|---|---|---|---|
| 7,039,603 | B2 * | 5/2006 | Walker | G06Q 20/401 705/14.69 |
| 10,937,063 | B1 * | 3/2021 | Ng | G06Q 20/356 |
| 10,963,704 | B2 * | 3/2021 | Glaser | G07G 1/0036 |
| 2015/0012396 | A1 * | 1/2015 | Puerini | G06Q 10/0875 705/28 |
| 2019/0281030 | A1 * | 9/2019 | Isaacson | H04L 63/0838 |
| 2021/0004606 | A1 * | 1/2021 | Se | G06V 20/52 |
| 2022/0374855 | A1 * | 11/2022 | Balaoro | G06Q 20/401 |
| 2023/0214906 | A1 * | 7/2023 | Chau | G06Q 30/0601 705/26.81 |

* cited by examiner

*Primary Examiner* — Florian M Zeender
*Assistant Examiner* — Vanessa Deligi
(74) *Attorney, Agent, or Firm* — Athorus, PLLC

(57) ABSTRACT

Described are systems and methods for in-facility purchase of items from a single seller when those items are offered for sale by multiple sellers. For example, a materials handling facility may include two or more sellers (Seller A and Seller B) that offer items for sale within the facility. A user may pick items from Seller A and items from Seller B and complete an in-facility purchase of those picked items from one of the sellers, such as Seller B, by payment of the purchase price and applicable taxes to that seller. At a subsequent time, for example when the user exits the facility, Seller B may pay Seller A at least a portion of the purchase price for the Seller A items sold by Seller B as part of the in-facility purchase.

21 Claims, 20 Drawing Sheets

| UNIQUE IDENTIFIER - 010A1835G | | |
|---|---|---|
| ITEM IDENTIFIER LIST 1000 | | |
| ITEM | QUANTITY | IN-FACILITY PURCHASED |
| ITEM 1 | 1 | X |
| ITEM 2 | 1 | X |
| ITEM 3 | 1 | X |
| | ⋮ | |
| ITEM N | X | X |

FIG. 10

| UNIQUE IDENTIFIER - 010A1835G ||||
|---|---|---|---|
| ITEM IDENTIFIER LIST 1200 ||||
| ITEM | QUANTITY | SELLER | IN-FACILITY PURCHASED |
| ITEM 1 | 1 | SELLER A —1205-1 | |
| ITEM 2 | 1 | SELLER A —1205-1 | X —1209-1 |
| ITEM 3 | 1 | SELLER B —1205-2 | |
| | ⋮ | | |
| ITEM N | X | SELLER A/B | |

UNIQUE IDENTIFIER - 010A1735G

ITEM IDENTIFIER LIST 1500

| ITEM | QUANTITY | SELLER | IN-FACILITY PURCHASED |
|---|---|---|---|
| ITEM 1 | 1 | SELLER A | 1505-1 |
| ITEM 2 | 1 | SELLER A | X — 1509 |
| ITEM 3 | 1 | SELLER B | 1505-2 |
| ITEM 4 | 3 | SELLER C | X — 1505-3 |
| ITEM 5 | 2 | SELLER A | X — 1509 |
| ITEM 6 | 2 | SELLER C | |
| ITEM 7 | 1 | SELLER B | X — 1509 |
| ⋮ | | | |
| ITEM N | X | SELLER Y | 1505-Y |

1503

1506 — IN-FACILITY SELLER: SELLER B

FIG. 15

IN-FACILITY ITEM PURCHASE

PRIORITY CLAIM

This application claims priority to U.S. Provisional Patent Application No. 63/280,011, filed Nov. 16, 2021, and titled "In-Facility Item Purchase," the contents of which are herein incorporated by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

FIG. 10 is a block diagram of an item identifier list, according to some implementations.

FIG. 12 is a block diagram of another item identifier list, according to some implementations.

FIG. 15 is a block diagram of another item identifier list, according to some implementations.

DETAILED DESCRIPTION

Figure 1A:
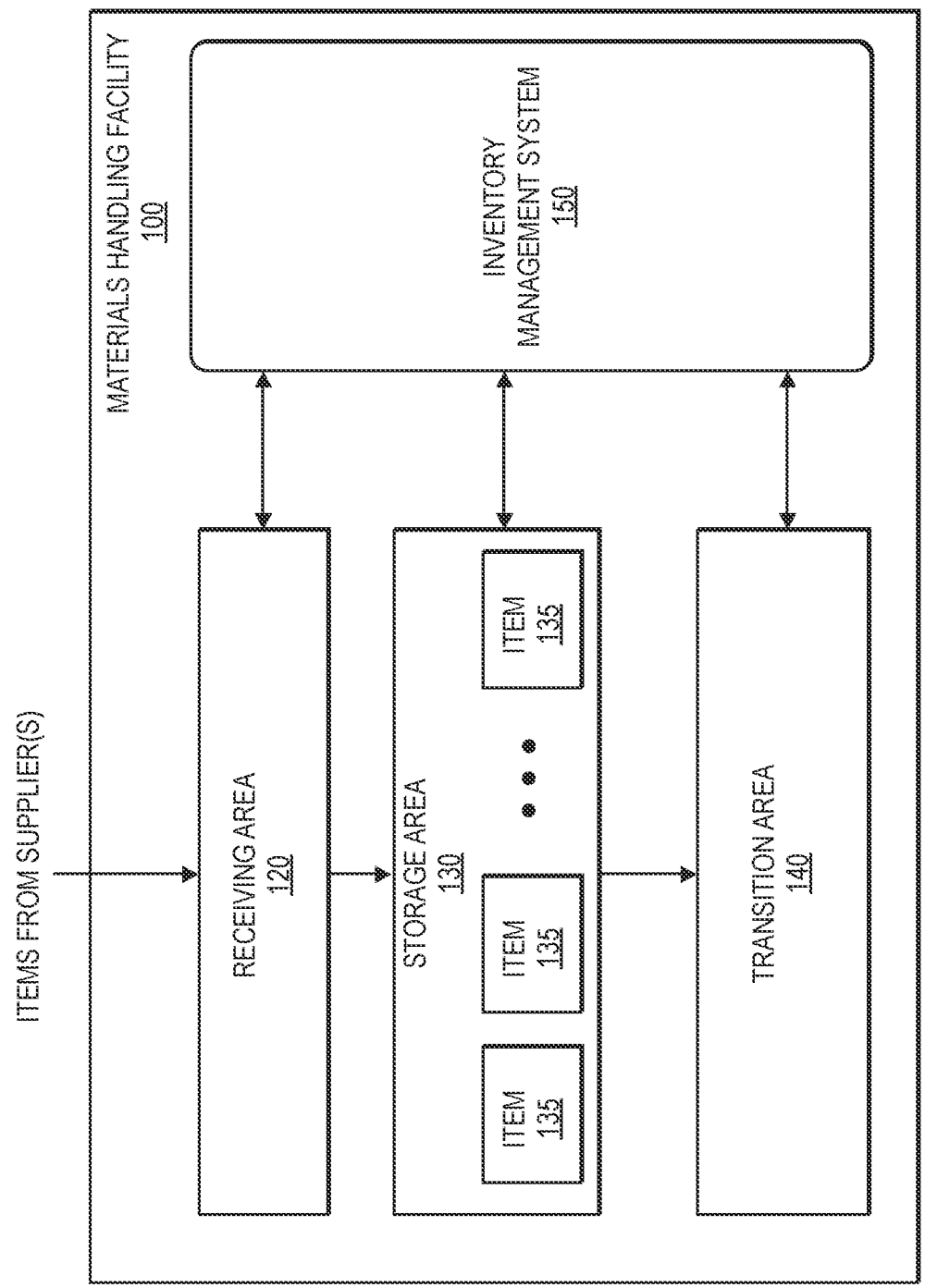
FIG. 1A is a block diagram illustrating a materials handling facility, according to some implementations.

This disclosure describes a system for tracking and identifying the picking and/or placing of items at inventory locations from within a materials handling facility (generally referred to herein as a "facility"), the in-facility purchase of picked items from one of potentially several sellers of items in the facility, and the transition of items from a materials handling facility. In some instances, a user may pick a first item sold by Seller A (a first seller of items within the facility) from an inventory location and purchase the first item, for example using cash, from Seller B (a second seller of items within the facility) while the user remains in the facility, referred to herein as an "in-facility purchase." Likewise, the seller involved in the in-facility purchase is referred to herein as the "in-facility seller."

As discussed further below, when the user picks the first item from the inventory location, the picked first item is identified and indicated on an item identifier list associated with a unique identifier that was generated for the user when the user entered the facility. When the in-facility purchase of the first item occurs between the user and Seller B, the user pays Seller B for the purchase price and applicable taxes for the first item and Seller B is the seller of record for the first item. The user may then enjoy the first item while the user remains located in the facility or maintain the first item for later use/consumption after leaving the facility. When the user subsequently leaves the facility, the user's departure is detected, items on the item identifier list associated with the unique identifier generated for that user, such as the first item, are determined and, in the above example, Seller B pays Seller A the purchase price for the first item, without paying the tax.

For example, a tax exempt wholesale account may be maintained between Seller A and Seller B, or any other combination of sellers within the facility, and upon departure of the user from the facility, the in-facility purchase of the first item by the user from Seller B, for which Seller A is the seller, is resolved through an inventory update of the first item from Seller A to Seller B, and then from Seller B to the user, and a tax-exempt purchase transaction for the purchase price of the item between Seller B and Seller A. As a result, Seller B is the retail seller of record of the first item to the user and collects the applicable taxes for the retail sale of that item. Likewise, the tax-exempt transaction between Seller B and Seller A transitions the item from Seller A, the original seller of the first item, to Seller B, such that Seller A is paid for the first item.

From the user perspective, because the first item was identified when the user picked the first item and/or identified during the in-facility purchase, and that identity maintained on an item identifier list, the transition of the user from the materials handling facility may be done automatically without any affirmative input from the user or delay to the user. For example, when the user is exiting the materials handling facility with the first item and possibly other items, the user will pass through a transition area (such a door exiting the facility, an area adjacent an exit to the facility, etc.) as the user exits the materials handling facility. When the user enters or passes through the transition area, the items identified on the item identifier list are automatically transitioned from the materials handling facility to the user and/or between different sellers within the facility, as appropriate. Continuing with the above example, when the user exits the facility, the first item is automatically transitioned from an inventory of Seller A to the inventory of Seller B to account for the inventory transition of the first item from Seller B to the user when the in-facility purchase occurred. Likewise, if the user has picked other items, such as a second item, for which the user did not perform an in-facility purchase, that second item may be transitioned directly to the user and the user charged for the purchase price and applicable taxes for the item. For example, if the user picked a second item for which Seller A is the seller, that second item, when picked by the user, is identified and maintained on the item identifier list associated with the unique identifier generated for that user. When the user passes through a transition area, it is determined that an in-facility purchase for that second item did not occur, a user account or other payment instrument of the user is automatically charged for the purchase price and applicable taxes for the item, and the inventory for the item is automatically transitioned from the Seller A inventory to the user, all without direct user involvement or delay.

In a similar manner, if the facility is a rental location, a library, etc., the transition area may be near the exit of the facility. When the user leaves with items, the items are transitioned from the materials handling facility to the user that is taking the items. In such a case, a rental or borrow time identifying when the items are to be returned may be associated with the items and the user account of the user. The transition of the items may be done automatically and without any affirmative input or delay to the user.

In some implementations, the identity of items picked and/or placed into inventory locations within the materials handling facility may be identified based on data received from a variety of input devices. For example, an image capture device (e.g., a camera) may capture a series of images of a user's hand before the hand crosses a plane into the inventory location and also capture a series of images of the user's hand after it exits the inventory location. Based on a comparison of the images, it can be determined whether the user picked an item from the inventory location or placed an item into the inventory location. For example, based on an analysis of the images, it can be determined that the user is not holding an item when the hand crosses the plane into the inventory location but is holding an item when the hand is removed from the inventory location (the user picked an item from the inventory location). Likewise, image analysis can be used to identify if the user is holding an item in their hand before the hand crosses into the inventory location but is not holding an item when the hand is removed from the inventory location (the user placed an item into the inventory location).

In examples where it is determined that a user has picked an item from the inventory location, it can be determined what items were stocked, stored or otherwise associated with the inventory location, the seller of those items determined, and the item identifier list associated with the unique identifier generated for the user may be updated to identify that the user has picked one of the items associated with that inventory location and identify the seller of the picked item(s). By having knowledge of the items stored at an inventory location and the seller of those items, actual identification of the picked item through processing of the captured images is not necessary. Simple and quick processing to detect that an item has been picked is sufficient. However, in some implementations, additional image processing may be performed to confirm that the picked item corresponds to the item associated with the inventory location and seller prior to the item identifier list being updated.

In examples where it is determined that a user has placed an item into the inventory location, it can be determined what items were associated with the user prior to the placement of the item into the inventory location. Likewise, a stored representation of each of those items may be retrieved and compared with an image of the placed item in an effort to identify the placed item. If a high confidence score is determined from a comparison of the stored representations and the image of the placed item, the placed item may be identified as the item and the item identifier list may be updated to indicate that the user has placed the item. A further determination may also be made as to whether the placed item corresponds with or is otherwise supposed to be located at the inventory location. If the placed item is supposed to be at that inventory location, a stock quantity for that item at that inventory location may be updated. However, if the placed item does not belong at that inventory location, an associate may be dispatched to retrieve the item from the inventory location.

By detecting the pick and/or placement of items by users in the materials handling facility, the movement of items within and exiting the facility may be accomplished without requiring the user to undergo additional processing of the items. For example, if the materials handling facility is a retail store, users may pick items from within the facility, place the items into a cart, bag, pocket, or otherwise carry the items and the items are automatically identified and associated with the user. When the user exits the facility, the items may be transitioned from the facility to the user and the user charged a purchase price and applicable taxes for the picked items. This may be done without the user having to undergo the additional step of checking out with a cashier, the cashier identifying and scanning each item and the user paying the cashier for the items.

In implementations in which there are items within the materials handling facility that are sold by different sellers within the facility, the seller of each picked item may also be determined and included on the item identifier list, or otherwise maintained for the picked items. When the user exits the facility and is charged for the purchase and taxes corresponding to the picked items, one or more subsequent or backend transactions may occur so that the seller(s) of those picked items are paid for the sale of the items and the corresponding inventory updated accordingly. Again, the user is able to exit the facility without having to undergo the additional step of checking out with a cashier, purchasing the items from the different sellers, etc.

In addition, if the user desires to in-facility purchase the picked items, the user may complete the purchase though payment of the purchase price and applicable taxes to a single seller within the facility, even if the picked items are sold by one or more different sellers of items within the facility. When the user later exits the facility or otherwise moves through a transition area, the items indicated on the item identifier list maintained for the user are determined and, in instance where the in-facility seller is different than the seller of the item(s), the purchase price for each in-facility purchased item is paid by the in-facility seller to the appropriate seller of the item(s) picked by the user. Similar to the above examples, the user is able to exit the facility without having to undergo any additional steps and is able to in-facility purchase multiple items, potentially sold by different sellers, from a single seller within the facility.

In still other examples, with the disclosed implementations, a user may pick multiple items, in-facility purchase some of those items and exit or transition from the materials handling facility with still other items, some or all of which may be sold by different sellers within the facility, that were not in-facility purchased. As discussed further below, the item identifier list may include an item identifier and seller identifier for each of the picked items as well as an indication of whether the item was in-facility purchased. For items that were in-facility purchased, upon exit/transition of the user from the materials handling facility, the appropriate transactions (payment/inventory) occur between the in-facility seller and the indicated seller of the item. For items picked by the user that were not in-facility purchased, the user is charged for the purchase price and applicable taxes for the item, again without the user having to stop or otherwise be delayed as they exit the facility.

As used herein, a materials handling facility, or facility, may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1A. As shown, a materials handling facility 100 includes a receiving area 120, a storage area 130 configured to store an arbitrary number of inventory items 135, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. Likewise, the items 135 may be sold from within the facility by different sellers. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, seller, or any other suitable parameters with respect to newly received items 135. It is noted that items 135 may be stocked, managed, or dispensed in terms of countable, individual units or multiples of units, such as packages, cartons, crates, pallets, or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration, or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 and/or item sold by the same seller, may be stored or displayed together in bins, on shelves, or via other suitable storage mechanisms, such that all items 135 of a given kind or from the same seller are stored in one inventory location within the storage area 130. In other implementations, like items 135 or items from the same seller may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored as well as the identity of the seller of each item. Each inventory item may be associated with the corresponding inventory location in which it is stored, and the association may be maintained in an inventory data store 1715 (FIG. 17) accessible by the inventory management system 150. Likewise, a seller of each inventory item may be associated with the corresponding inventory item and/or inventory location and the association may also be maintained in the inventory data store 1715 (FIG. 17) and/or seller data store 1721 (FIG. 17) and accessible by the inventory management system.

When a customer order specifying one or more of items 135 is received, or as a user progresses through the materials handling facility 100, the corresponding items 135 may be selected or "picked" from inventory locations within the storage area 130. For example, in one implementation, a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the user may be captured. For example, when the user reaches an inventory location and passes their hand into an inventory location within the storage area 130, one or more images may be captured of the user's hand prior to it passing into the inventory location. Again, when the user's hand is removed from the inventory location, one or more images may be captured of the user's hand as it exits the inventory location. Those images may be compared to determine whether a user has picked an item from the inventory location or placed an item in the inventory location. In some implementations, a simple image analysis may be performed to determine changes between the images. For example, image analysis may be performed on the first image to determine a skin tone color of the user's hand and pixels including that color, or a range of colors similar to the identified skin tone color, may be identified to represent the user's hand. Utilizing the skin tone colors, the images of the user's hand obtained after the user's hand is removed from the inventory location may be processed to again identify the user's hand. Finally, a comparison of the segments of the images representing the user's hand and an area surrounding the user's hand may be compared to determine a change between the images to identify whether an item has been picked or placed into the inventory location. In another example, item recognition may be performed on both images to identify different items. For example, the image(s) captured prior to the user's hand entering the inventory location may only include an item that is in the shape of a hand. In comparison, the image(s) captured after the user's hand is removed from the inventory location may include an object in the shape of the user's hand plus an additional item. It will be appreciated that any image analysis and/or comparison technique may be used to determine if a user has placed and/or picked an item from an inventory location.

When a user enters or passes through a transition area 140, the items identified on the item identifier list associated with the user may be transitioned. A transition area may be any designated area within, around or near a materials handling facility. For example, the transition area may be an exit from the materials handling facility and, when the user passes through the exit (transition area), the items identified on the item identifier list associated with the user may be transitioned from the storage area 130, as discussed herein. Such information may be maintained by the inventory management system 150 to enable accurate tracking of items. Other examples of a transition area include, but are not limited to, packing stations, a perimeter surrounding the materials handling facility, designated areas within the materials handling facility, a loading bay of the materials handling facility, a parking lot associated with the materials handling facility, and the like.

If the items are departing the materials handling facility (e.g., a carrier is taking the items for transport, a customer is purchasing or renting the items), when the user passes through the exit (transition area) of the materials handling facility, the items identified on the item identifier list are transitioned from the materials handling facility to the user. For example, if the user is purchasing the items, the ownership of the items may be transferred to the user and the user charged a fee for the items when the user exits the materials handling facility with the items, as discussed further below.

Figure 1B:
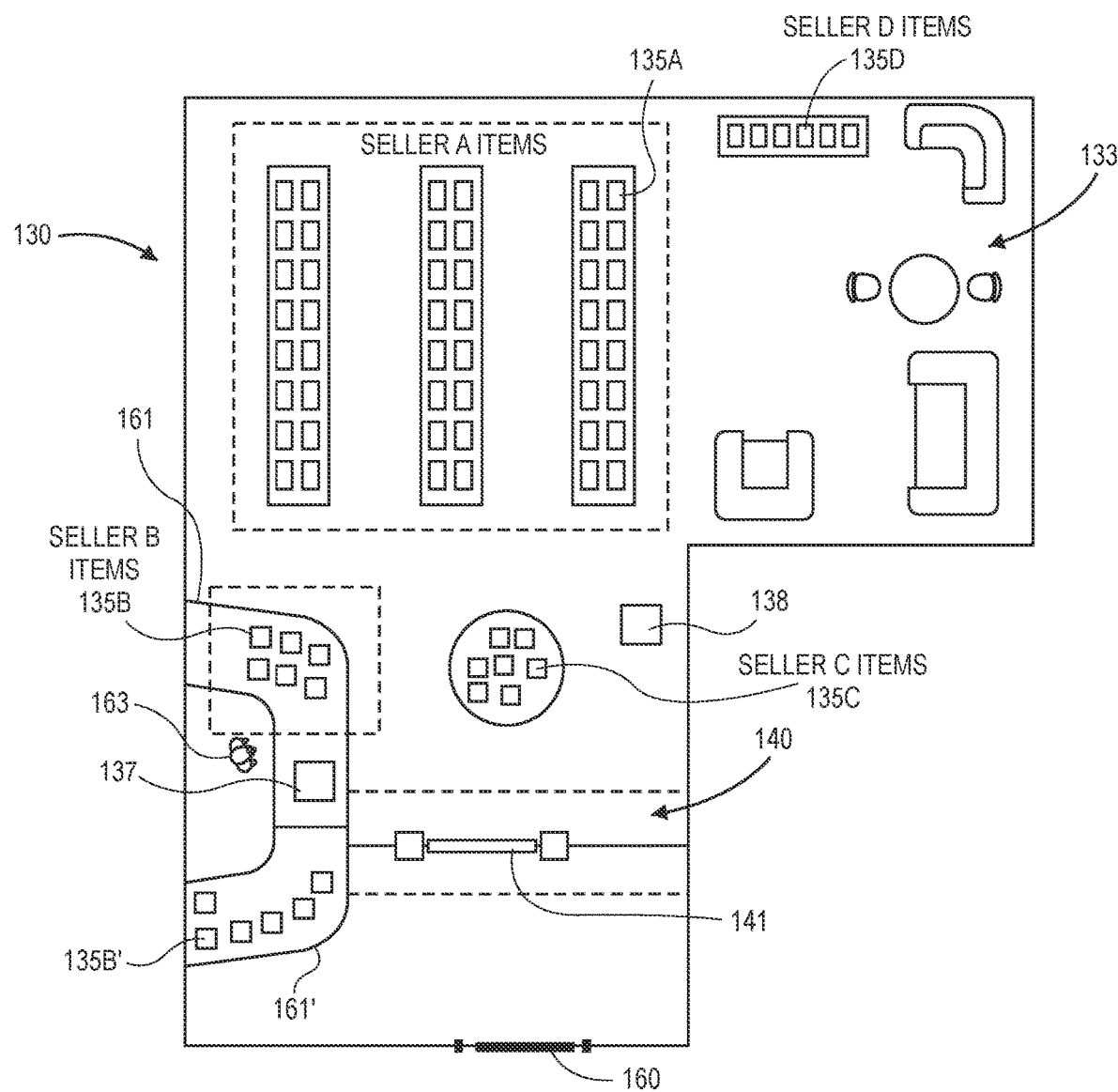
FIG. 1B is a block diagram illustrating additional details of a storage area of a materials handling facility, according to some implementations.

FIG. 1B is a block diagram illustrating additional details of a storage area 130 of a materials handling facility, according to some implementations.

In the illustrated example, the storage area 130 includes an entrance/exit 160 and an access point 141 into the storage area 130 through which a user or associate must pass to enter the storage area 130. Within the storage area 130 there are multiple items 135 that, in this example, are sold by different sellers. For example, Seller A may offer items 135A for sale within the facility (referred to herein as Seller A items), Seller B may offer items 135B for sale within the facility (referred to herein as Seller B items), Seller C may offer items 135C for sale within the facility (referred to herein as Seller C items), and Seller D may offer items 135D for sale within the facility (referred to herein as Seller D items). While the illustrated example indicates four sellers of items, in other implementation, additional or fewer sellers may offer items for sale within the facility.

Also, in some implementations, Seller A, who may perform the disclosed implementations and/or operate the inventory management system, may or may not be a seller of items within the facility.

As illustrated in this example, Seller B may also offer items 135B' for sale to users before the user is authenticated and passes through the access point 141. For example, a user may pre-purchase items 135B' from Seller B before arriving at the facility and simply retrieve the item from a counter 161' that is accessible to the user after the user enters the storage area though the entrance 160 but before the user passes through the access point 141. Alternatively, or in addition thereto, users may purchase items 135B' directly from Seller B without entering or passing through the access point 141. In such an example, the purchase/sale of items 135B', for which Seller B is the seller, occur directly between the user and Seller B such that Seller B is the seller of record. When a user passes through the access point 141, the user may be identified using a variety of techniques and a user account with the inventory management system corresponding to the user determined. For example, the user may present an identifier, such as password, biometric identifier (e.g., palm scan, fingerprint scan, retinal scan, etc.), pass phrase, unique code, an active identifier, such as a Radio Frequency Identifier ("RFID") associated with the user, a visual identifier (e.g., barcode, bocode, etc.), or any other form of identifier that may be used by the inventory management system 150 to identify the user. Alternatively, or in addition thereto, as discussed further below, one or more images of the user may be generated of the user and processed to identify the user.

Is some instances, if the user does not desire to be identified, does not have an account with the materials handling facility 150, desires to pay for picked items without charging an account (e.g., cash purchase, credit card purchase), the user may notify an associate, such as a Seller B associate, that the user prefers to provide in-facility purchase and the associate may provide the user access to the storage area 130. For example, the associate may scan or otherwise present an in-facility purchase identifier to indicate that the user prefers in-facility purchase of items.

As discussed further below, after passing the access point, the user may pick items from within the storage area 130 from any, some, or all of the sellers of items. For example, the user may pick a first item 135A that is a Seller A item and then proceed to a Seller B associate 163 at the counter 161, or any other location within the facility, and request an in-facility purchase of the first item 135A and a second item 135B that is a Seller B item. When the user picks the first item 135A, as discussed further below, the first item is identified and added to an item identifier list corresponding to the user.

The Seller B associate 163 may scan or otherwise identify the first item 135A and the second item 135B and the user may pay the associate 163 the retail purchase price and applicable taxes for the first item and the second item. For example, the associate 163 may have access to a cash register 137, computing system, or other component that is in communication with the inventory management system 150. In one example, the cash register 137 or other computing system may be at a fixed and known location, such as at a counter 161. In other examples, the associate 163 may utilize a portable device that is in communication with the inventory management system 150, such as a tablet, wearable, or other similar computing device that can be carried or otherwise moved throughout the facility by the associate.

When the associate scans or otherwise identifies the first item 135A, the inventory management system 150 may provide retail price/tax information to the associate through the register 137, even though Seller B is not the seller of the first item. Likewise, because Seller B is the seller of the second item 135B, the retail price/tax information for the second item may be directly available to the associate 163 through the register 137 (or other device) and/or provided by the inventory management system 150.

The associate 163 may then receive the retail payment and applicable taxes from the user for the first item 135A and the second item 135B and the user may take those items. For example, the user may proceed to a lounge area 133 where the user may enjoy or consume the first item 135A and the second item 135B, the user may exit the facility/storage area 130, or the user may proceed through other portions of the storage area 130, optionally picking other items.

As another example, the user may pick a first item 135A that is a Seller A item, pick a second item 135C that is a Seller C item, pick a third item 135D that is a Seller D item and then proceed to a self-service payment kiosk 138 to complete an in-facility purchase of the picked items. As discussed further below, when the user picks the first item 135A, the second item 135C, and the third item 135D, each item is identified and indicated on an item identifier list corresponding to the user.

The user may then scan or otherwise identify the items at the self-service kiosk 138 and make payment for the retail price and applicable taxes for those items. Alternatively, the user may be determined to be positioned at the self-service kiosk 138 and the inventory management system 150 may present the item identifiers to the user via the self-service kiosk based on the items indicated on the item identifier list corresponding to the user. The user may then verify the accuracy of the items and make payment for the retail price and applicable taxes for the items. The user may then take those items. For example, the user may proceed to a lounge area 133 where they may enjoy or consume the first item 135A, the second item 135C, and/or the third item 135D, the user may exit the facility/storage area 130, or the user may proceed through other portions of the storage area 130, optionally picking other items.

As still another example, provided the user authenticated when passing through the access point 141, the user may pick a first item 135A for which Seller A is the seller, pick a second item 135C for which Seller C is the seller, pick a third item 135D for which Seller D is the seller and then proceed to the lounge area 133 to enjoy/consume the items 135A, 135C, 135D without making an in-facility payment for the items. Alternatively, or in addition thereto, the user may make an in-facility purchase from Seller B of a fourth item 135B for which Seller B is the seller and a fifth item 135D for which Seller D is the seller. As still another example, the user may order or request to order an item from a seller, such as Seller B, and then proceed to the lounge area 133, continue picking other items, etc., while the item is prepared. At some point, the requested item may be provided to or delivered to the user. For example, an associate may deliver the item to the user while the user is located in the lounge area 133. As yet another example, the user, while located in the lounge area 133 (or any other location within the facility) may interact with an associate, such as an associate of Seller C, request or order an item(s) from the associate, and the item(s) may be delivered to the user while the user is located in the lounge area 133, or at any other location within the facility.

In another example, some items may not be directly available to a user from within the inventory location, such as high value items, large items, etc. In such an example, the item may be represented by a tag or other identifier from within the inventory location, selected from a kiosk 138, selected through an interface accessible through a user device in the possession of the user, etc., that is selectable by the user. The user may purchase the item from a seller, such as Seller C, by presenting the tag to the seller or selecting the item through a kiosk, etc., and arrange to have the item delivered or provided to the user at a later point in time. For example, the user may purchase the item from a seller and select to have the item provided to the user as the user is exiting the facility, select to have the item shipped or delivered to a delivery destination (e.g., the user's home), select to have the item shipped or delivered to another location or another user, etc.

In still another example, prior to arriving at the facility and/or while the user is located in the facility, the user may pre-order an item from a seller, such as Seller B, for pickup when the user arrives at the facility or while the user is located at the facility. For example, the user may access via a user device in the possession of the user, an application or interface associated with Seller B and pre-order an item for pickup when the user arrives. Subsequently, when the user arrives, the user may pick up, retrieve, or otherwise be provided the pre-ordered item as the user enters the facility or after the user is authenticated at the access point 141. If the user obtains the pre-ordered item after the user passes the access point 141, the item may be indicated on an item pick list associated with the user. If the user picks additional items while located in the facility, those additional items may likewise be included on the item pick list. The user may then complete an in-facility purchase of some or all of the items on the item pick list, including the pre-ordered item, from any of the sellers located within the facility and/or transition from the facility with the picked items, including the pre-ordered item. As discussed further below, the sale of those items, including the pre-ordered item, from either the in-facility seller or based on the detection of the items when the user exits the facility is completed. In some implementations, the sale of each of the items, including the pre-ordered item, may be completed as a single transaction.

In any of the above examples, when the user passes through the transition area 140, which in this example encompasses the access point 141, the user is determined by the inventory management system 150 and items indicated on the item identifier list corresponding to the user are determined. For items indicated on the item identifier list corresponding to the user for which the user did not complete an in-facility purchase, the account of the user is automatically charged the purchase price and applicable taxes for the item(s). Likewise, the seller of each item that was not in-facility purchased is determined and payment for the purchase price of those items is paid to the seller. The inventory for that seller may also be updated to indicate that the user purchased the item. For each in-facility purchased item indicated on the item identifier list corresponding to the user, the in-facility seller of the item is determined, as is the seller of the item, and payment for the purchase price of the item is made from the in-facility seller of the item to the seller of the item. For example, if Seller B is the in-facility seller of item 135A for which Seller A is the seller, at least a portion of the purchase price for item 135A is paid by Seller B to Seller A.

Figure 2:
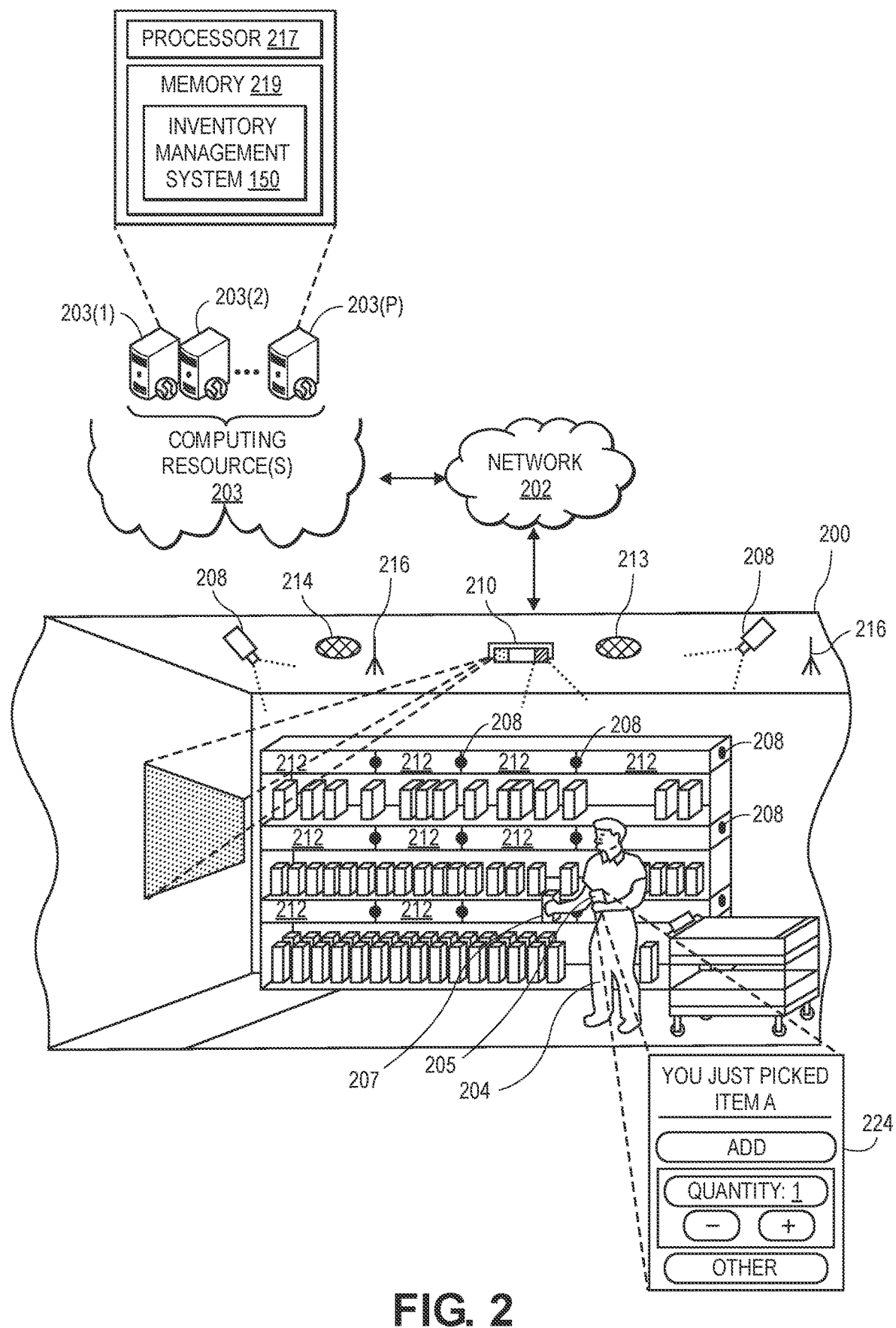
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations and/or images of objects (e.g., a user's hand, items) moving into and/or out of the inventory locations. Cameras 208 may also be positioned at or near transition areas to capture images of users as they enter or pass through the transition area 140.

Any type of camera and/or configuration of cameras may be used with the implementations described herein. For example, one or more of the cameras may be RGB cameras. In other implementations, one or more of the cameras may be depth sensing cameras.

In addition to cameras, other input devices, such as pressure sensors, infrared sensors, a scale, load cells, a volume displacement sensor, a light curtain, etc., may be utilized with the implementations described herein. For example, a pressure sensor and/or a scale may be used to detect when an item is added and/or picked from inventory locations. Likewise, an infrared sensor may be used to distinguish between a user's hand and inventory items. In another example, load cells may be positioned on a surface of the transition area to detect when a user is passing through the transition area.

In some implementations, a user 204 located in the materials handling facility 200 may possess a portable device 205 and obtain information about items 207 located within the materials handling facility 200 via the portable device. Generally, the portable device 205 has at least a wireless module to facilitate communication with the inventory management system 150 and a display (e.g., a touch-based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc., to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s) 203 that may be local to the environment (e.g., materials handling facility), remote from the environment, or any combination thereof.

The inventory management system 150 may utilize antennas 216 within the materials handling facility 200 to create a wireless network 202 (e.g., Wi-Fi) and/or connect to an external network (e.g., the Internet) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case of a user entering a materials handling facility, picking an item from an inventory location of the materials handling facility and exiting the materials handling facility with the item. Upon entering the materials handling facility, the inventory management system 150 may identify the user (e.g., facial recognition, user ID card, user provided information, biometrics) or receive from an associate an in-facility purchase identifier for the user. Upon identifying the user, a user account corresponding to the user is determined and optionally information (e.g., item retrieval history, view history, purchase history, user profile, payment information) may be retrieved from a data store. Likewise, upon identifying the user or upon receipt of the in-facility purchase identifier, a unique identifier may be generated and associated with the user and the user account determined for the user, or the provided in-facility purchase identifier.

In some implementations, as the user progresses through the materials handling facility 200, imaging devices 208 may obtain/capture one or more images of the user 204 and provide the image(s) to the computing resource(s) 203, which may include a processor 217 and/or a memory 219, for processing. For example, an image of a user's hand just before it crosses a plane into an inventory location and an image of the user's hand just after it is removed from the inventory location may be captured and provided to the computing resource(s) 203. The computing resource(s) 203 may process the images to determine whether an item has been picked and/or placed into the inventory location. If it is determined that an item has been picked from the inventory location, the inventory management system may obtain an identification of the inventory item stored at the inventory location and include an item identifier for that inventory item in an item identifier list associated with the unique identifier corresponding to the user to identify that the user has picked the item from the inventory location. Likewise, an inventory quantity for the inventory item at that inventory location may be decreased to reflect that the item has been picked from the inventory location.

In another example, if the inventory management system 150 cannot identify the item the user picked from the inventory location, the inventory management system 150 may utilize other information about the user (e.g., past purchase history, currently picked items) to assist in identifying the item. For example, if the inventory management system cannot determine if the picked item is a bottle of ketchup or a bottle of mustard, the inventory management system may consider past purchase history and/or what items the user has already picked from other inventory locations. For example, if the user historically has only picked/purchased ketchup, that information may be used to confirm that the user has likely picked ketchup from the inventory location.

In some implementations, data from other input devices may be used to assist in determining the identity of items picked and/or placed in inventory locations. For example, if it is determined that an item is placed into an inventory location, in addition to image analysis, a weight of the item may be determined based on data received from a scale, pressure sensor, load cell, etc., located at the inventory location. The image analysis may be able to reduce the list of potentially matching items down to a small list. The weight of the placed item may be compared to a stored weight for each of the potentially matching items to identify the item that was actually placed in the inventory location. By combining multiple inputs, a higher confidence score can be generated increasing the probability that the identified item matches the item actually picked from the inventory location and/or placed at the inventory location. In another example, one or more radio RFID readers may collect or detect an RFID tag identifier associated with a RFID tag included on the item.

An RFID tag generally refers to a device with an antenna or resonator that can produce a wireless signal when activated or powered. The wireless signal produced by the RFID tag is typically low power and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

If information is presented to the user from the inventory management system 150, such information may be presented via the portable device 205 and/or other output devices positioned within the materials handling facility. The portable device may be used to identify to the user a confirmation of the item picked from the inventory location and/or to request that the user identify the inventory item picked/placed into the inventory location. For example, if the identity of a picked inventory item is confirmed but the inventory management system 150 cannot determine with a high degree of accuracy the number of inventory items picked, the inventory management system may provide item information to the user via the portable device 205 and request that the user identify the quantity picked. For example, the portable device may identify that the user has picked item A from the inventory location. The user may then confirm whether the item is to be added to the item identifier list and/or how many of those items are to be added to the item identifier list associated with the user, via the control 224. Other information and/or options relating to an item may also be presented to the user.

When the user exits the materials handling facility, the user passes through a transition area. Rather than requiring that the user stop and confirm the items picked that the user is removing from the materials handling facility, the user may simply depart the materials handling facility with the picked items. Because the picked items have already been identified and included on the item identifier list associated with the user, there is no need for the user to stop and confirm the picked items before departing. When the user passes through the transition area (e.g., exit of the materials handling facility), the user is identified and the items identified on the item identifier list are transferred from the materials handling facility to the user. For example, the inventory quantity for the materials handling facility may be decremented, the user may be charged the purchase price and applicable taxes for the items, and the items may be associated with a purchase history of the user. Likewise, the user may receive a notification, such as an electronic message, identifying the items that have been transitioned to the user and/or purchased by the user. The electronic message may be transmitted to an e-mail address of the user, presented on the portable device 205 associated with the user, etc. Items for which the user completed an in-facility purchase prior to progressing through the transition area, it is determined that the user has already paid for the items and any payments/inventory adjustments between sellers within the facility may be completed in response to detecting the user passing through a transition area, as discussed herein.

Figure 3:
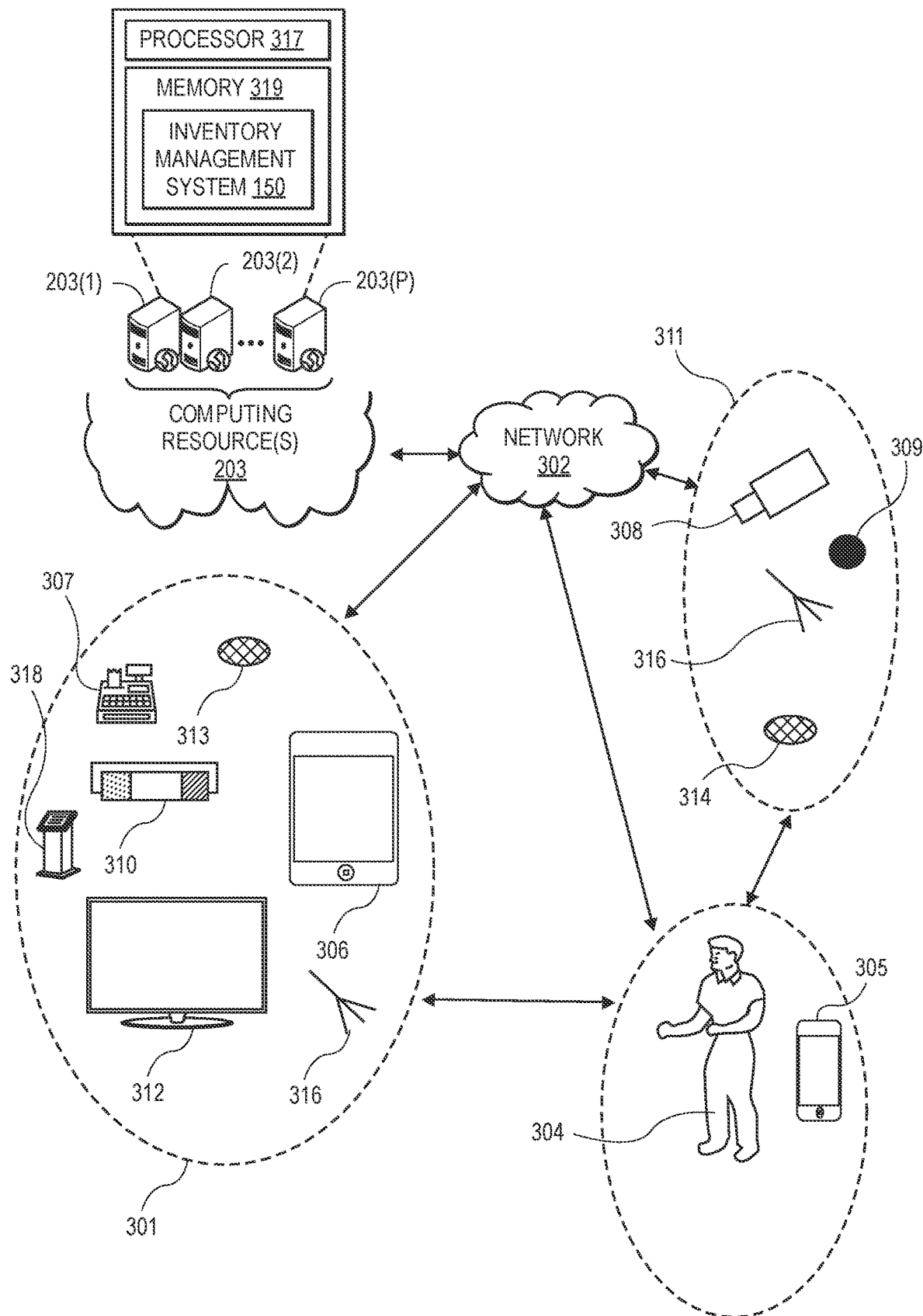
FIG. 3 shows additional components and communication paths between component types utilized in a materials handling facility of FIG. 1A, according to some implementations.

FIG. 3 shows additional components and communication paths between component types utilized in an inventory management system 150 of FIG. 1A, in accordance with some implementations. As discussed above, the portable device 305 may communicate and interact with various components of an inventory management system 150 over a variety of communication paths. Generally, the inventory management system 150 may include input components 311, output components 301 and computing resource(s) 203. The input components 311 may include an image capture device 308 (e.g., camera), microphone 314, antenna 316, sensor, scale 309, light curtain, a volume displacement sensor, or any other component that is capable of receiving input about the surrounding environment, from the user of the portable device, and/or from the portable device. The output components 301 may include a projector 310, a portable device 306, a display 312, an antenna 316, a radio, speakers 313, a self-service kiosk 318, a cash register 307, and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 311, output components 301 and/or directly with the portable device 305 and/or the user 304.

As illustrated, the computing resource(s) 203 may be remote from the environment and implemented as one or more servers 203(1), 203(2), . . . , 203(P) and may, in some instances, form a portion of a network-accessible computing platform implemented as a computing infrastructure of processors, storage, software, data access, and so forth that is maintained and accessible by components/devices of the inventory management system 150 via a network 302, such as the Internet. For example, the computing resource(s) 203 may process images to determine whether an item has been picked from an inventory location or placed into an inventory location. The computing resource(s) 203 do not require end-user knowledge of the physical location and configuration of the system that delivers the services. Common expressions associated for these remote computing resource (s) 203 include "on-demand computing," "software as a service (Saas)," "platform computing," "network-accessible platform," "cloud services," "data centers," and so forth.

Each of the servers 203(1)-(P) include a processor 317 and memory 319, which may store or otherwise have access to an inventory management system 150, which may include or provide image processing (e.g., for user identification and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

Figure 4:
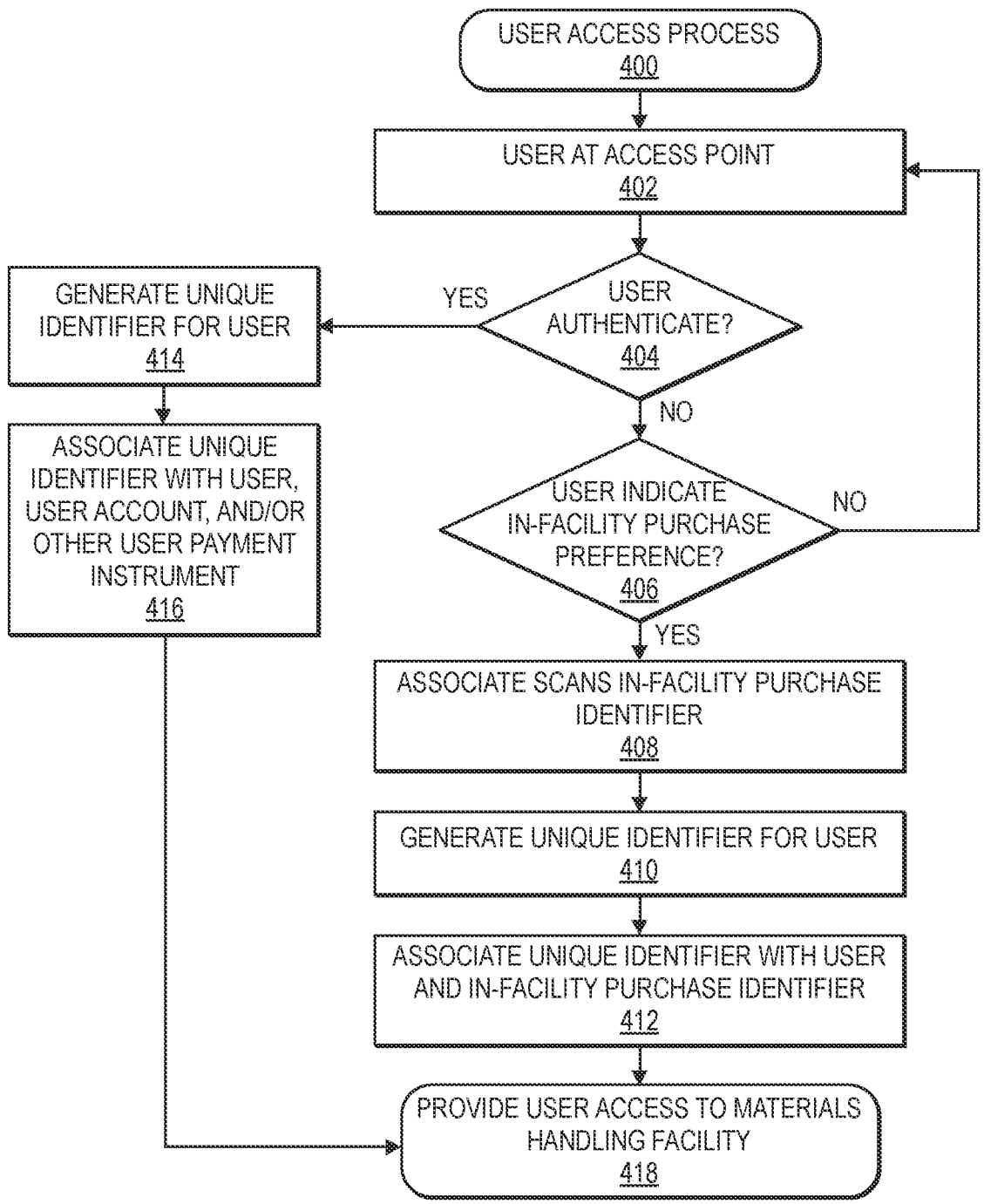
FIG. 4 is an example user access process, according to some implementations.

FIG. 4 is an example user access process 400, according to some implementations.

The example process 400 begins upon detection of a user at an access point to a material handling facility or an area, such as a storage area, within a materials handling facility, as in 402. Upon detection of a user at the access point, a determination is made as to whether the user has been authenticated, as in 404. As discussed above, a user may be authenticated using any of one or more of a variety of techniques. For example, the user may provide an identifier, such as a user identifier, biometrics (e.g., palm scan, fingerprint, retinal scan), a credit card, debit card, check card, or other physical identifier, a seller provided identifier that identifies the user, facial recognition may be performed on an image of the user, and/or other techniques may be used alone or in conjunction to authenticate the user. In some implementations, a portable device of the user may be detected when the user enters the materials handling facility and used to identify the user. Alternatively, an application executing on a portable device may be utilized by the user to identify the user. The portable device and/or application may include a user identifier or code that is provided to the inventory management system 150 and used to identify the user.

If it is determined that the user has been authenticated, a unique identifier is generated for the user, as in 414, and the unique identifier is associated with the user account or other payment instrument provided by the user, as in 416. For example, if the user has authenticated using a credit card, the unique identifier may be associated with the user and the provided credit card (payment instrument). The unique identifier may be maintained and associated with the user while the user is located within the facility and utilized to correspond information with the user while the user is located in the facility, such as an item identifier list, user location, etc., without having to include or provide any user identifiable information.

If it is determined at decision block 404 that the user has not been authenticated, a determination is made as to whether the user has indicated an in-facility purchase preference, as in 406. A user may indicate an in-facility purchase preference, for example, by notifying an associate located in the facility, selecting a control button or indicator at the access point indicating an in-facility purchase preference, etc. If it is determined that an in-facility purchase preference has not been received, the example process returns to block 402 and continues. If it is determined that an in-facility purchase preference has been received, an associate within the facility scans or otherwise provides an in-facility purchase identifier, as in 408. The in-facility purchase identifier may be, for example, a unique account that may be associated with the user while the user is located in the materials handling facility. Alternatively, in some implementations, the in-facility purchase identifier may correspond to a particular seller of items within the facility, such as Seller B. Likewise, in some implementations, the in-facility purchase identifier may be automatically generated in response to the user providing an in-facility purchase preference, with or without the associate providing the in-facility purchase identifier.

In addition to determining an in-facility purchase identifier for the user, a unique identifier is generated for the user, as in 410, and associated with the user and the in-facility purchase identifier, as in 412. As with the unique identifier generated for an authenticated user, the unique identifier generated at block 412 may be maintained and associated with the user while the user is located within the facility and utilized to correspond information with the user while the user is located in the facility, such as an item identifier list, user location, etc., without having to include or provide any user identifiable information.

Finally, after associating the unique identifier with the user account and/or other user payment instrument, as in block 416, or after associating the unique identifier with the user and the in-facility purchase identifier, as in block 412, the user is provided access through the access point to the materials handling facility/storage area, as in 418.

Figure 5:
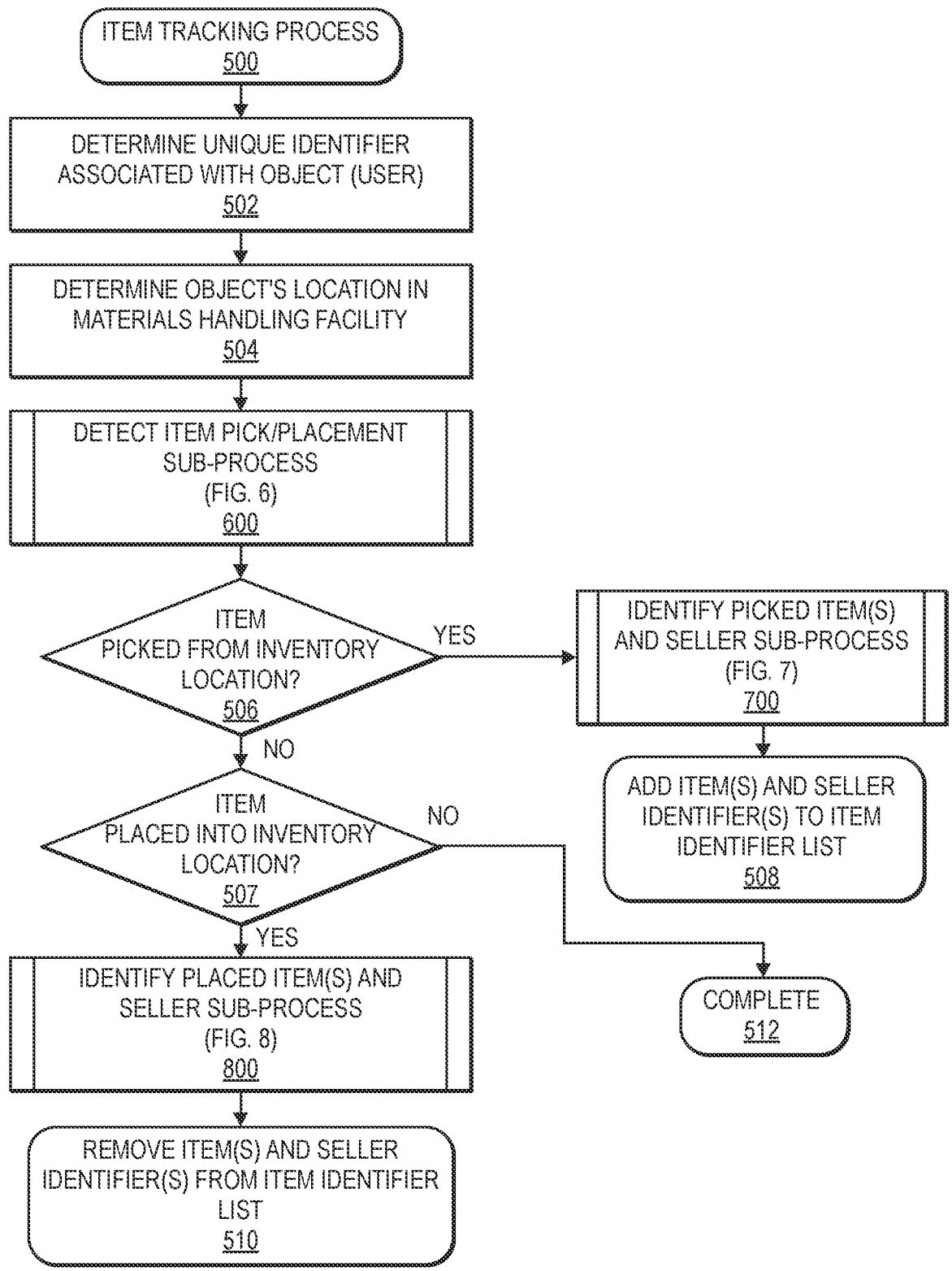
FIG. 5 depicts a flow diagram of an example process for tracking interaction and/or movement of an item, according to some implementations.

FIG. 5 depicts a flow diagram of an example process 500 for tracking interaction and/or movement of an item, according to some implementations.

The example process 500 begins by identifying a unique identifier associated with a user located in the facility, as in 502. For example, image processing may be used to monitor a location of an object that is the user that corresponds to the unique identifier generated for the user when the user entered the materials handling facility. Through use of the unique identifier and object tracking, the user location can be monitored within the materials handling facility without the need or use of any user identifiable information about the user. The systems may simply use the unique identifier that corresponds to the object being monitored.

In addition to determining the unique identifier, the location of the object corresponding to the unique identifier within the materials handling facility and identification of the inventory location within the object's location may also be determined, as in 504. In some implementations, imaging devices located within the materials handling facility may be used to capture images within the materials handling facility that are processed by the computing resource(s) 203 to monitor the location of the object that is the user. Likewise, microphones may record sounds made by the object and the computing resource(s) may process those sounds to determine a location of the object that is the user within the facility. For example, based on knowledge of the locations of the microphones within the materials handling facility, a time offset between audio signals received by each microphone can be computed to determine a location of the object that is the user.

In order to identify the time offsets between signals received by various microphones, in some instances, the computing resource(s) 203 compile each audio signal received by respective audio transducers and then determine the time offsets between the signals by, for instance, using any time-difference-of-arrival ("TDOA") technique, or any other suitable technique. After identifying the respective time offsets, the computing resource(s) 203 can determine a direction and/or source location of the audio.

In addition to, or as an alternative to visual and/or audio location determination, the inventory management system 150 may also utilize other techniques, such as triangulation between antennas 216, to determine the location of the object that is the user as the object moves through the materials handling facility. In other examples, if the user is carrying a portable device that includes a global positioning system (GPS) chip or other position determining component, the inventory management system may be configured to receive the GPS information/position information and determine the location of the portable device, and thus the object that is the user.

The example process 500 may also detect whether an item was picked from an inventory location or placed into an inventory location, as in sub-process 600. The sub-process 600 for determining if an item has been picked from an inventory location or placed into an inventory location is discussed in further detail below with respect to FIG. 6. As discussed below, in some implementations, it may be determined that both an item has been placed into the inventory location and an item has been picked from the inventory location. For example, a user may place an item into the inventory location and during the same action pick an item from the inventory location.

Based on the response from the example sub-process 600, a determination is made as to whether an item was picked from the inventory location, as in 506. If it is determined that an item was picked from the inventory location, the sub-process for identifying the picked item and the seller of the picked items is performed, as in 700. The example sub-process 700 for determining an identity of an item picked from the inventory location and the seller of the picked item is discussed further below with respect to FIG. 7. Following completion of the sub-process 700 for determining an identity of the picked item and the seller of the picked item, the example process 500 adds an item identifier representative of the picked item to the item identifier list associated with the user, as in 508. Likewise, in some implementations, the seller of the item may also be indicated on the item identifier list. In other examples, the seller may not be indicated on the item identifier list but may otherwise be linked to or associated with the item identifier indicated on the item identifier list and/or the picked item. For example, the item identifier list data store 1719 may be updated to associate the item identifier representative of the picked item with the item identifier list corresponding to the unique identifier that is being monitored for the object that is the user. Likewise, a seller identifier of the picked item may be included in the item identifier list or otherwise associated with the item identifier indicated on the item identifier list.

Returning to decision block 506, if it is determined that an item has not been picked from the inventory location, a determination is made as to whether an item was placed into the inventory location, as in 507. If it is determined that an item was placed into the inventory location, the identity of the placed item and the seller of the placed item is determined, as in sub-process 800. The example sub-process 800 for determining an identity of an item placed into an inventory location and the seller of the placed item is discussed further below with respect to FIG. 8.

Once the identity of the item placed into the inventory location and the seller of the placed item is determined, an item identifier representative of the item is removed from the item identifier list associated with the unique identifier of the user, as in 510. Likewise, the seller of the placed item may be removed from the item identifier list with respect to the placed item. The item identifier and associated seller identifier may be removed from the item identifier list because the user has picked the item from their tote, cart, bag, etc., and placed it back into an inventory location. For example, the item identifier list data store 1719 may be updated to remove an association between the item identifier and the item identifier list corresponding to the unique identifier that relates to the object that is the user.

Returning to decision block 507, if it is determined that an item has not been placed into the inventory location (i.e., an item has neither been picked from the inventory location nor placed into the inventory location), the example process 500 completes, as in 512.

In some implementations, item identifiers may be added to an item identifier list associated with a user in response to the user receiving an item. For example, if an item is prepared by an associate of a seller within the facility and provided to the user, the item identifier representative of the item may be added to the item identifier list. In one implementation, the associate may confirm to the inventory management system 150 that the item has been provided to the user and the item identifier representative of the item may be added to the item identifier list associated with the unique identifier corresponding to the user. In still another example, the user may select an item that is, at a later point in time, delivered or otherwise provided to the user. Upon selection and/or delivery of the item, an item identifier representative of the item may be added to the item identifier list associated with the unique identifier corresponding to the user. For example, if the user selects an item that is to be prepared and delivered to the user while the user is in the lounge area of the materials handling facility, an item identifier representative of the selected item may be added to the item identifier list associated with the unique identifier when the item is delivered to the user. In another example, some items may not be directly available to a user from within the inventory location, such as high value items, large items, etc. In such an example, the item may be represented by a tag or other identifier from within the inventory location, selected from a kiosk 138, etc., that is selectable by the user. The user may purchase the item from a seller, such as Seller C, by presenting the tag to the seller or selecting the item through a kiosk, etc., and arrange to have the item delivered or provided to the user at a later point in time. For example, the user may purchase the item from a seller and select to have the item provided to the user as the user is exiting the facility, select to have the item shipped or delivered to a delivery destination (e.g., the user's home), select to have the item shipped or delivered to another location or another user, etc.

While the above example describes the process of placing or picking an item from the inventory location being performed serially, in other implementations, the blocks 506, 507, 508, 510 and sub-processes 700, 800 may be performed in parallel. For example, if the example sub-process 600 determines that a user has both placed an item into the inventory location and picked an item from the inventory location, the following sub-processes 700, 800 may be performed in parallel.

By identifying items picked from inventory locations and/or placed at inventory locations concurrently with the pick or place of these items, an item identifier list associated with the unique identifier corresponding to the user is kept current. The user may view and/or access the item identifier list at any time to confirm the picked items and/or to identify other items to be picked. Likewise, if the user exits the materials handling facility, rather than the user having to stop and have the picked items identified and confirmed, the user can proceed without stopping or other delay because the items picked by the user are already known and can be automatically transitioned to the user from one or more sellers within the facility without any affirmative input from the user, as discussed further below.

Figure 6:
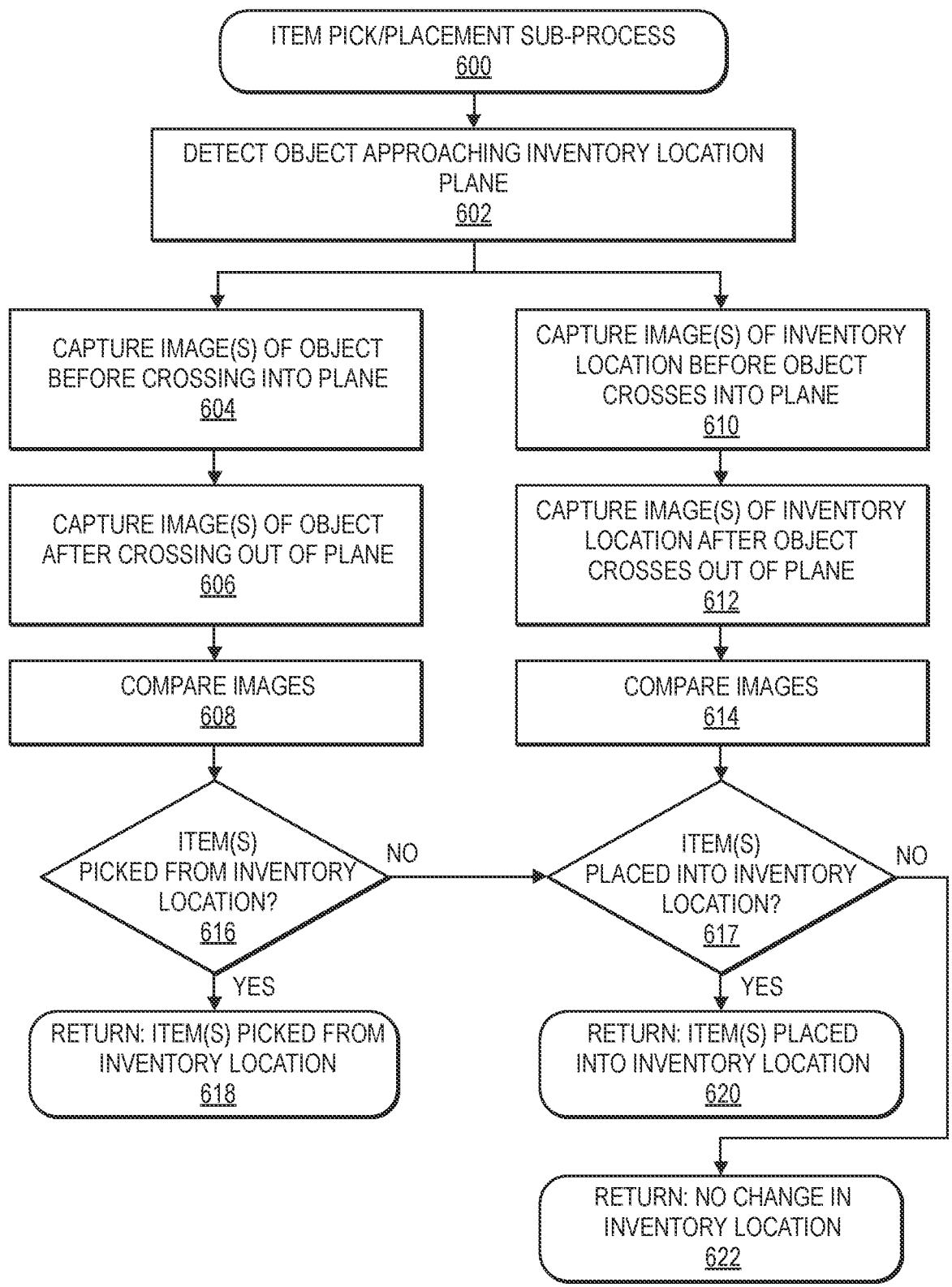
FIG. 6 depicts a flow diagram of an example item pick/placement sub-process, according to some implementations.

FIG. 6 depicts a flow diagram of an example item pick/placement sub-process 600, according to some implementations. The example sub-process 600 begins by detecting an object, such as a user's hand approaching the vertical plane representing the face or front edge of the inventory location, as in 602. One or more input devices (e.g., camera) located within the materials handling facility may collect images (data) of the location that include the inventory location that are used to detect the object. In other examples, data may be collected by a light curtain or other presence detection device and used to detect the object. In general, data is collected by at least one input device of the plurality of input devices located in the materials handling facility and used to determine that an object is approaching the inventory location.

Upon detecting an object approaching the inventory location, and before the object crosses the plane into the inventory location, one or more images (data) are captured that include the object, as in 604. Subsequently, and after the item is picked from the inventory location, one or more of the input devices capture one or more images (data) that include the object and/or the picked item, as in 606. In some implementations, the one or more images of the object before the object enters the inventory location and/or after the object is removed from the inventory location, may be a series of images that make up a video.

The image(s) captured before the object entered the inventory location and the image(s) captured after the object is picked from the inventory location are then compared, as in 608. For example, a pixel similarity comparison may be performed on the images to identify similar content. For example, if the object is a user's hand, pixels of a similar color matching a color palette typically associated with skin tones may be identified and determined to represent the user's hand. By performing this pixel analysis on both images captured before the object enters the inventory location and images captured after the object exits the inventory location, the same object (in this example the user's hand) may be identified in each image. Based on this information, surrounding pixels may be compared between the images to determine if an item was either included in the user's hand when it went into the inventory location and/or whether an item was included in the user's hand when it was picked from the inventory location.

For example, pixels of a similar color and shape included in the images captured before the user's hand entered the inventory location may be detected and determined to represent an item. If those similar pixel shapes and/or colors are not identified in the image(s) captured after the user removes their hand from the inventory location, it may be determined that the user has placed an item into the inventory location.

Likewise, if only the user's hand is identified in images captured before the user's hand is placed into the inventory location and pixels representing a distinct shape are identified in the image(s) captured when the user removes their hand from the inventory location, it may be determined that the user has picked an item from the inventory location.

Returning to block 602, in some implementations, one or more processes of capturing images may be performed to provide further information for determining if an item has been picked from an inventory location or placed into an inventory location. For example, the example sub-process may also utilize one or more cameras located within the inventory location to capture one or more images of inventory stored at the inventory location before the object crosses into the inventory location, as in 610. For example, images of inventory stored in the inventory location may be periodically captured and stored in an inventory data store accessible by the inventory management system 150.

After an object (e.g., user's hand) has moved into and out of the inventory location, one or more images of the inventory location may be captured, as in 612. The image(s) representing the inventory stored in the inventory location prior to the object entering the inventory location and the images representing the inventory stored in the inventory location after the object exits the inventory location may be compared to determine if an item has been placed into or picked from the inventory location, as in 614.

In some implementations, because inventory items are generally stationary when stored in the inventory location, a simple image comparison from a fixed position camera may be performed to determine changes between the images and thus a determination made as to whether one or more items have been picked from the inventory location and/or whether one or more items have been added to the inventory location. This may be particularly useful when it is difficult to determine, based on images of the object moving into and out of the inventory location, how many items were picked and/or placed into the inventory location. For example, if the inventory includes bags of chips and the user removes multiple bags of chips by grabbing the tops of the bags together, it may be difficult to determine from the images captured from outside the inventory location how many bags were picked. However, because the bags are stationary when stored in the inventory location, a quantity of bags stored in the inventory location may be determined by capturing one or more images of the inventory location, processing those images to identify shapes of objects and comparing the number of shapes with the quantity of inventory located at that inventory location. Each shape may then be associated with an item of inventory. Likewise, additional information, such as the stored dimension values for the inventory items, may also be utilized to assist in determining the number of items located in the inventory location. In a similar fashion, images captured after the inventory items have been picked may be captured and processed to identify the number of objects included in those images. By comparing the before and after quantity count of items identified in the images, it may be determined how many items were picked from the inventory location or placed into the inventory location.

While the example sub-process 600 illustrates image capture and comparison steps 604-608 being performed in parallel with the image capture and comparison steps 610-614, in other implementations, only one of the series of steps may be performed. In other implementations, the sets of steps may be performed serially.

Utilizing the comparison of the images, a determination may be made as to whether one or more items were picked from the inventory location, as in 616, and/or placed into the inventory location, as in 617. If it is determined that one or more items were picked from the inventory location, the example sub-process returns an indicator that an item(s) has been picked from the inventory location, as in 618. If it is determined that an item has not been picked from the inventory location, a determination is made as to whether one or more items have been placed into the inventory location, as in 617. If it is determined that one or more items have been placed into the inventory location, the example sub-process 600 returns an indication that an item(s) has been placed into the inventory location, as in 620. As noted above, it may be determined that an item has been placed into the inventory location and another item has been picked from the inventory location. In such an instance, blocks 618 and 620 may both be completed and information regarding both occurrences may be returned.

Finally, if it is determined that an item has not been placed into the inventory location (i.e., an item has not been picked from the inventory location or placed into the inventory location), the example sub-process 600 returns an indication that there has been no change in the inventory location, as in 622.

Figure 7:
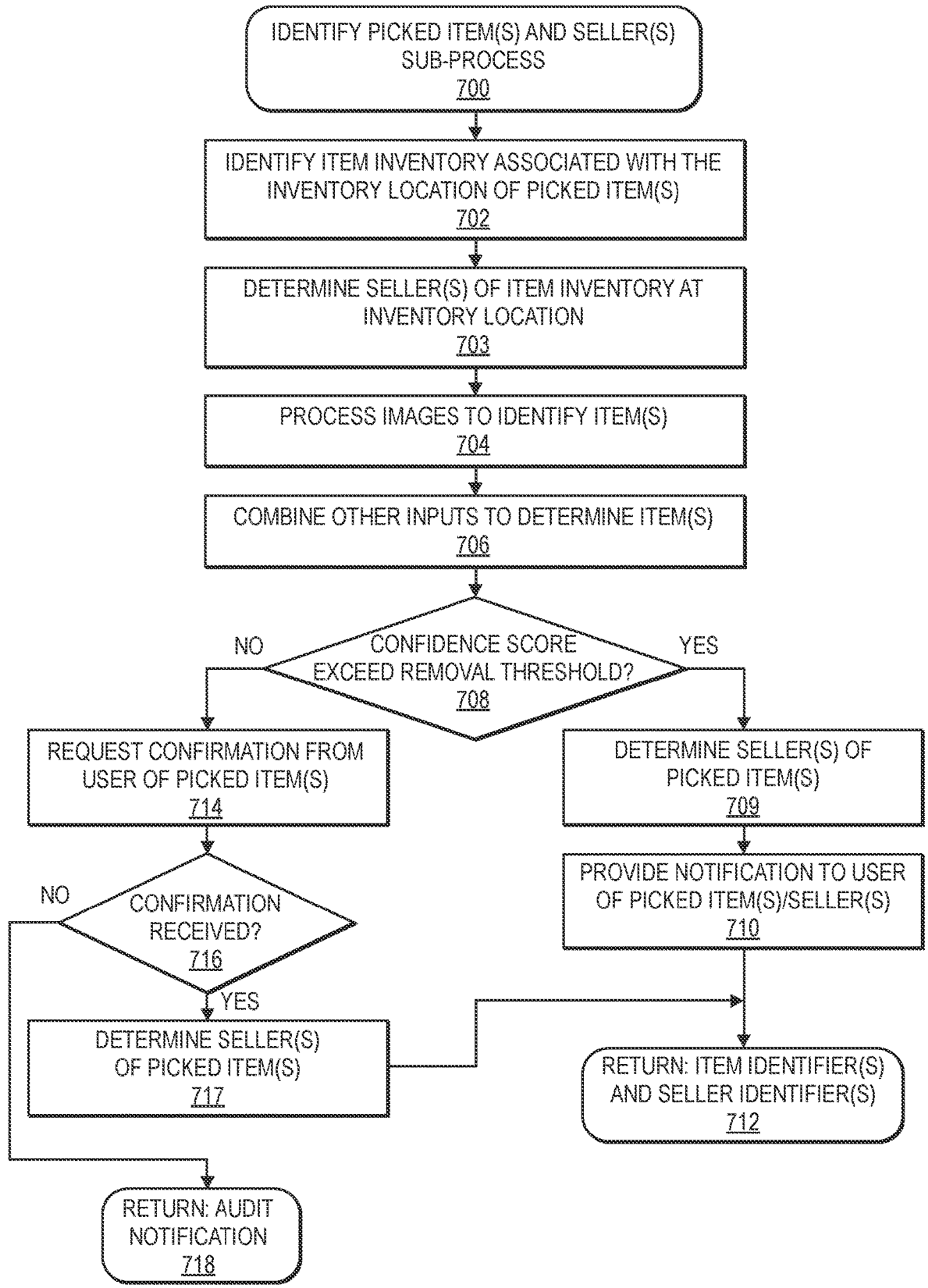
FIG. 7 depicts a flow diagram of an example sub-process for identifying a picked item and seller, according to some implementations.

FIG. 7 depicts a flow diagram of an example sub-process 700 for identifying a picked item and a seller of the picked item, according to some implementations.

The example sub-process 700 begins by identifying item inventory associated with the inventory location of the picked item, as in 702, and the seller of the inventory item, as in 703. As discussed above, the inventory management system may store inventory information for each inventory location, identifying the inventory items, the quantity of inventory items stored at each inventory location, and the seller of each inventory item located at each inventory location. In addition to identifying the inventory item(s) and seller(s) associated with the inventory location, in some implementations, one or more of the images captured in steps 604-606, 610-612 (FIG. 6) may be processed to identify the item that has been picked from inventory to confirm that the inventory item associated with the inventory location corresponds with the item identified in the images. For example, in some implementations, image processing may be performed on the collected images (data) to identify the item included in the images and/or to identify features of the item, as in 704. Such information may be compared to stored item information about the inventory item to confirm whether the captured image of the item corresponds with the information for inventory items associated with the inventory location.

In some implementations, data collected by other input devices may also be considered to determine the identity of the item that was picked from the inventory location, as in 706. For example, in some implementations, a change in a pressure sensor and/or weight sensor may be received and compared with a stored weight for inventory items located at the inventory location.

Based on the information utilized to determine the identity of the item picked from the inventory location, a confidence score may be determined identifying how probable it is that the identified item corresponds with the item actually picked from the inventory location. A determination may then be made as to whether the confidence score exceeds a pick threshold, as in 708. The pick threshold may be any defined number to be exceeded before the identified item is determined to correspond with the item actually picked from the inventory location.

If it is determined that the confidence score exceeds the pick threshold, the item is determined and a seller of the item is determined, as in 709. As noted above, the inventory management system may maintain information indicating the seller of each item at each inventory location within the materials handling facility. Accordingly, when the picked item from the inventory location is determined, the seller corresponding to that item may be quickly determined.

A notification may also be provided to the user identifying the item the user has picked from the inventory location, as in 710. As discussed above, the notification may be presented on a display located on or near the inventory location, presented on a portable device in possession of the user, projected onto a surface near the user, etc. Likewise, the example sub-process 700 also returns an identification of the item picked from the inventory location and an identification of the seller of the item picked from the inventory location, as in 712.

If it is determined at decision block 708 that the confidence score does not exceed the pick threshold, a request that the user confirm the identity of the picked item may be presented to the user, as in 714. For example, the example sub-process 700 may present to the user (e.g., via a display, portable device, projection, audible) the item or items that it believes were picked and request that the user confirm the identity of the actually picked item. Likewise, if the example sub-process 700 is not able to determine a number of items picked from the inventory location, a request may be presented asking the user to confirm a number of items picked from the inventory location. In some implementations, if the suggested item does not correspond to the item actually picked, the user can interact with the inventory management system to identify the actual picked item and/or the quantity of picked items.

In some implementations, in addition to or instead of presenting the item to the user, the captured images may be provided to an associate that reviews the images to identify the placed and/or picked item. If the associate can determine the identity of the item, a request may not be sent to the user and instead the item identifier of the identified item may be returned, as in 712.

In still other examples, if the item picked by the user cannot be determined and the user has indicated that they will purchase the items as part of an in-facility purchase, the items may be flagged by the example process 700 and identified by the associate or the self-service kiosk used by the user during the in-facility purchase of those items.

After presenting the request to the user, a determination may be made as to whether the user provided the requested confirmation, as in 716. If it is determined that the user has provided a confirmation, the seller of the confirmed item is determined, as in 717, the example sub-process proceeds to block 712, and continues as discussed above. However, if the user does not provide a confirmation, the example sub-process 700 may return an audit notification indicating to the inventory management system that the user needs to be audited prior to the inventory transitioning within or from the materials handling facility, as in 718. In some implementations, the audit notification may result in an associate being dispatched to the user to confirm the identity of the item picked from the inventory location. In other implementations, the audit notification may be an indicator to an associate or a self-service kiosk that the items are to be identified and the item identifier list corresponding to the unique identifier associated with the user updated to indicate the item identifier of each item as part of the in-facility purchase of those items.

Figure 8:
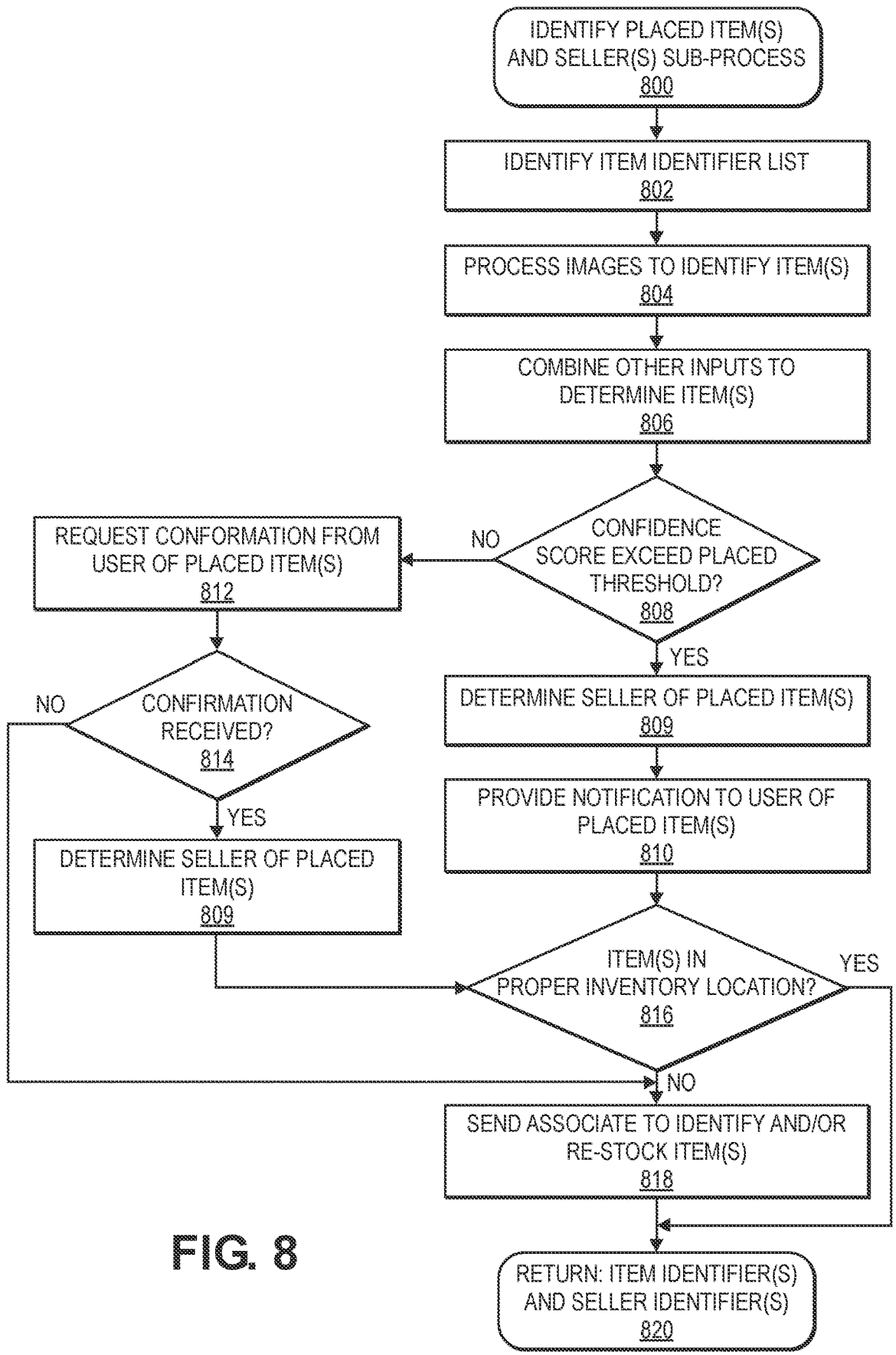
FIG. 8 depicts a flow diagram of an example sub-process for identifying a placed item and seller, according to some implementations.

FIG. 8 depicts a flow diagram of an example sub-process 800 for identifying a placed item and a seller of the placed item, according to some implementations.

The example sub-process 800 begins by identifying items identified in the item identifier list associated with the unique identifier corresponding to the object that placed the item, as in 802. As discussed above, the item identifier list identifies items that the object that is the user has picked from inventory locations while in the materials handling facility and may be stored in the item identifier list data store 1719 and associated with the unique identifier corresponding to the user. In addition, images captured at blocks 604-606, 610-612 (FIG. 6) may be further processed to detect an identity of an item placed into an inventory location. For example, the images may be processed to detect a size or shape of an item, a color of an item, characters or other identifying information for the item, etc., as in 804. The detected information may then be compared with information stored for each of the items included in the item identifier list to determine items that have potentially been placed into the inventory location. For example, if the item identifier list identifies a bottle of ketchup, a bag of chips, a gallon of milk, a screwdriver, and a soda bottle, stored information for each of those items may be retrieved and used to compare with the information detected from the processed images in an effort to determine which item identified in the item identifier list was placed into the inventory location.

In addition to comparing information determined from the captured images, the example sub-process may also combine data collected by other input devices to determine an identity of the item, as in 806. Continuing with the above example, the inventory location may include a scale, and a weight of the item placed into the inventory location can be determined. The determined weight may then be compared with weights stored for each item included in the item identifier list to identify those that potentially correspond with the item placed into the inventory location. As another example, the inventory location may include a pressure sensor that can detect a shape or dimension of the bottom of the item as it sits on the pressure sensor. The shape of the bottom of the item may be compared with stored dimension information for each item on the item identifier list.

Based on the gathered information about the item placed into the inventory location, a confidence score may be determined representing a probability that the identified item represents the item actually placed into the inventory location. A determination may then be made as to whether the confidence score exceeds a placed item threshold, as in 808. Similar to the picked item threshold, the placed item threshold may be any defined score or value.

If it is determined that the confidence score exceeds the placed item threshold, a seller of the placed item may be determined, as in 809. As discussed above, when the item is picked and identified, the seller of the picked item is determined and included in the item identifier list or otherwise associated with the picked item. As a result, once the placed item is determined, the associated seller may likewise be determined from the existing association with the determined placed item. In addition, a notification may be provided to the user identifying the item that the user placed into the inventory location, and optionally the seller of that placed item, as in 810.

If it is determined at decision block 808 that the confidence score does not exceed the placed item threshold, a request may be presented asking the user to confirm the identity of the item placed into the inventory location, as in 812. For example, the example sub-process 800 may present to the user the identity of item(s) that it believes may have been placed into the inventory location. Likewise, the example sub-process 800 may request that the user identify a quantity of items placed into the inventory location. A determination may then be made as to whether a confirmation was received from the user, as in 814. If it is determined that a confirmation was received, the seller of the placed item is determined, as in 809 (discussed above).

Upon providing a notification to the user at block 810 or after determining the seller of the placed item at block 809, a determination may be made as to whether the identified item is in the proper inventory location, as in 816. As discussed above, the inventory management system 150 may maintain inventory in specific inventory locations throughout the materials handling facility, for example, by seller. If an item is placed into an inventory location that does not typically store that inventory item or that inventory item sold by the determined seller, it may be determined that the placed item is not in the proper inventory location. In other implementations, inventory may be placed in any inventory location. In such a representation, the decision block 816 may not be considered.

If it is determined that the identified item is not in the proper inventory location (816), or if it is determined that the user did not confirm an identity of the item placed into the inventory location (814), an associate may be dispatched to the inventory location to retrieve and/or identify the placed item, as in 818. In some implementations, the associate may be a human. In other implementations, the associate may be an automated drive unit and/or a robot configured to manage and/or handle inventory.

If it is determined that the placed item is in the proper inventory location and/or after dispatching an associate to retrieve the inventory item, the example sub-process 800 may return an identification of the placed inventory item and an identifier of the seller of the placed inventory item, as in 820. In instances where the example sub-process was not able to identify the item placed into the inventory location such that the confidence score exceeded the placed item threshold and the user did not provide a confirmation of the item's identity, block 820 may be delayed until the dispatched associate has identified the placed item.

In the following examples described with respect to FIGS. 9 through 11, the facility is a two-seller facility that includes Seller A and Seller B, each of which may sell items within the facility, Seller A controls or maintains the inventory management system that may perform some or all of the disclosed implementations, and Seller B provides in-facility purchase of items, Seller A items and/or Seller B items, for users that indicated an in-facility purchase preference.

Figure 9:
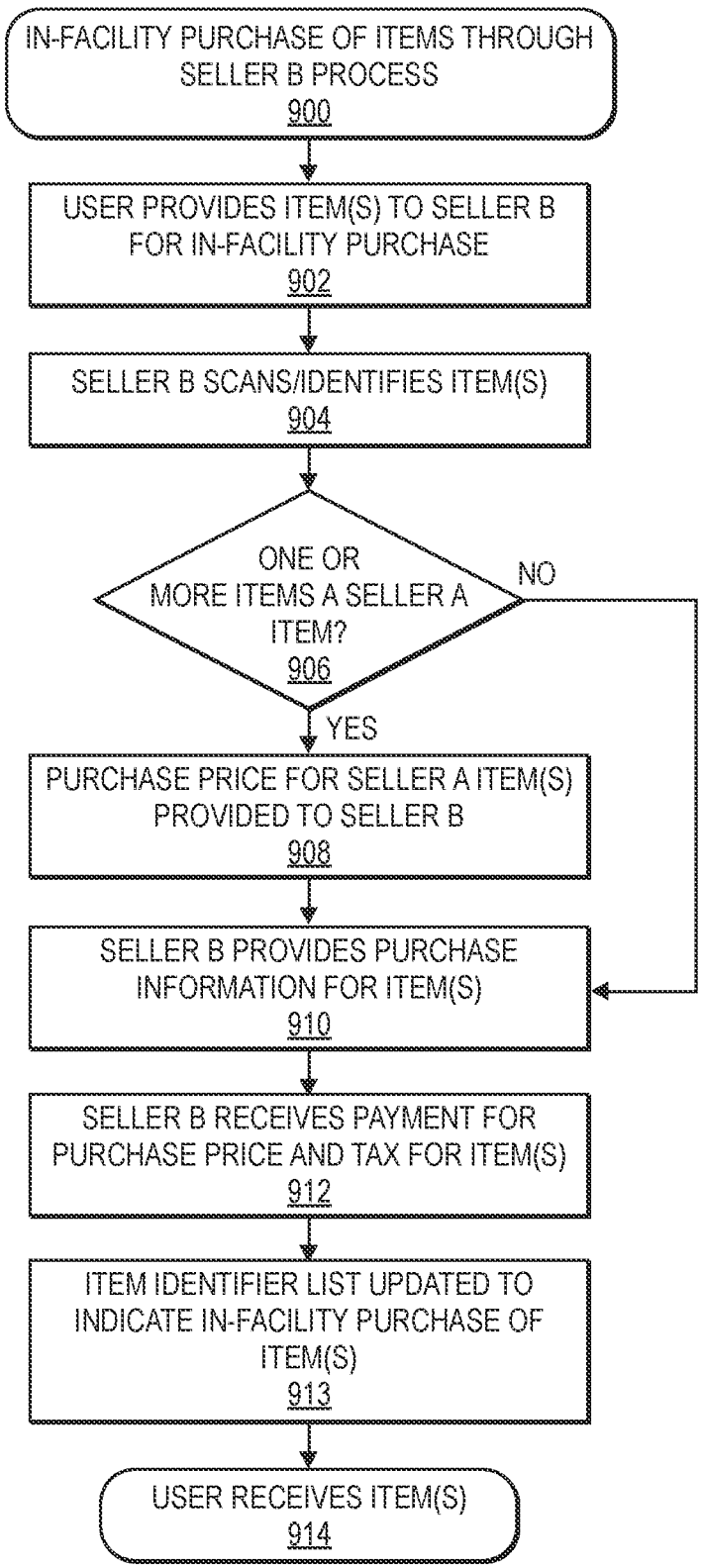
FIG. 9 is an example in-facility purchase of items through seller B process, according to some implementations.

FIG. 9 is an example in-facility purchase of items through seller B process 900, according to some implementations. The example process 900 may be performed for users that identify at the access point to the materials handling facility/storage area, that they will perform an in-facility purchase of picked items. As discussed above, when a user identifies in-facility purchase preference, an in-facility purchase identifier is provided by an associate within the facility (or automatically) and associated with the unique identifier that is generated and corresponds to the user. Likewise, the example process 900 may be performed when there are two sellers of items, Seller B and Seller A in this example, that offer items for sale, rent, lease, etc., within the materials handling facility.

The example process 900 begins when a user provides one or more items picked by the user while located in the facility to Seller B for in-facility purchase of the one or more items, as in 902. As also discussed above, when the user picks one or more items from an inventory location within the facility, the one or more items are determined, along with the seller(s) of those one or more items, and an item identifier of each of the one or more items, and optionally the seller(s) of those items, are included on an item identifier list associated with the unique identifier corresponding to the user.

In implementations in which only two sellers offer items for sale within the facility and only one of those sellers offers in-facility purchase of items, in this example Seller B, the disclosed implementations may only indicate on the item identifier list items offered for sale by the other seller, in this example Seller A, when those items are picked by the user. In such a configuration, seller information is not needed on the item identifier list and items offered for sale by Seller B that are to be in-facility purchased do not need to be included on the item identifier list associated with the unique identifier that corresponds to the user as the user will purchase those items from Seller B while the user is located in the facility.

For example, and referring briefly to FIG. 10, illustrated is an item identifier list 1000 that includes an indication of items 1001 picked by a user while in the facility, a quantity 1003 of the items picked and, in the illustrated example, whether the item has been in-facility purchased 1009 by the user.

Returning to FIG. 9, upon receipt of the one or more items provided by the user to Seller B, Seller B scans or otherwise identifies the one or more items, as in 904. For example, Seller B may scan, using a computing device, scanner, etc., a barcode or other identifier included on each of the one or more items to determine an identity of each of the one or more items. In other examples, the inventory management system may provide to Seller B an indication of the items picked by the user, as indicated in the item identifier list. In still another example, image processing of the items provided by the user to Seller B may be performed to identify the items and the identity of those items provided to Seller B.

Upon identification of the one or more items, a determination may be made as to whether one or more of the one or more items is an item offered for sale (or rent, lease, etc.) within the facility by Seller A, as in 906. As noted above, when the user picks an item from an inventory location, the item and the seller of the item may be determined. Accordingly, upon identification of the item, the seller of the item may also be determined as it is already associated with the item. As another example, in a two-seller facility environment in which in-facility purchase is being performed by Seller B, upon scanning of the provided item(s), Seller B will be able to determine if Seller B is the seller of the item. If Seller B is not the seller of the item, then Seller A is the seller of the item.

If it is determined that one or more of the provided items is a Seller A item, the purchase price for the Seller A item(s) is provided to Seller B, as in 908. In some implementations, the purchase price for Seller A items may already be available to Seller B. In such examples, block 908 may be omitted. After the purchase price of the Seller A item(s) is provided to Seller B, or if it is determined at decision block 906 that there are no Seller A items, Seller B may provide the purchase information for the provided item(s), whether those items are Seller A items or Seller B items, to the user, as in 910. Purchase information may include, but is not limited to, the item identifiers for the provided items, the purchase price for the provided items, the appropriate taxes for the provided items, the total price with tax for the provided items, etc.

Seller B may then receive payment for the purchase price of the provided items and the appropriate taxes for the provided items, as in 912. In addition, the item identifier list associated with the unique identifier for the user may be updated to indicate which items included on the item identifier list have been purchased by the user from Seller B through an in-facility purchase (in-facility purchased items), as in 913. Finally, after payment for the in-facility purchased items is complete, the user receives the in-facility purchased items, as in 914. The user may then exit the facility, go to the lounge to enjoy/consume the in-facility purchased items, or otherwise remain in the facility.

FIG. 10 is a block diagram of an item identifier list 1000 associated with a unique identifier 1002 that corresponds to a user, according to some implementations.

The item identifier list 1000 may be generated in implementations in which there are two sellers (Seller A and Seller B) that offer items for sale in the materials handling facility and in which Seller B provides in-facility purchase of items. In addition, in this example, the disclosed implementations may only operate in a portion of the facility in which Seller A items are located but not Seller B items. As such, only Seller A items may be indicated on the item identifier list when picked by the user. In other examples, the disclosed implementations may operate throughout the facility but only picks for Seller A items may be identified and included on the item identifier list associated with the unique identifier corresponding to the user.

In the example item identifier list 1000 illustrated in FIG. 10, only Seller A items that have been picked by the user while located in the materials handling facility are indicated on the item identifier list 1000. In this example the user has picked one quantity of item 1 1001-1, one quantity of item 2 1001-2, one quantity of item 3 1001-3, though X quantity of item N 1001-N. As will be appreciated, any number of items 1001 and quantity 1003 of Seller A items may be picked by the user and identified on the item identifier list associated with the unique identifier corresponding to the user. In other implementations, the seller of each item may also be indicated on the item identifier list and/or items from either Seller A and/or Seller B that are picked by the user may be indicated on the item identifier list.

In addition, in this example, the item identifier list 1000 has been updated as part of the example process 900 (FIG. 9) and in-facility purchase 1009 of each of the items 1001-1 through 1001-N marked to indicate that the user has paid Seller B for the in-facility purchase of the items. In other implementations, the item identifier list 1000 may not include an indication of whether an item has been in-facility purchased.

Figure 11:
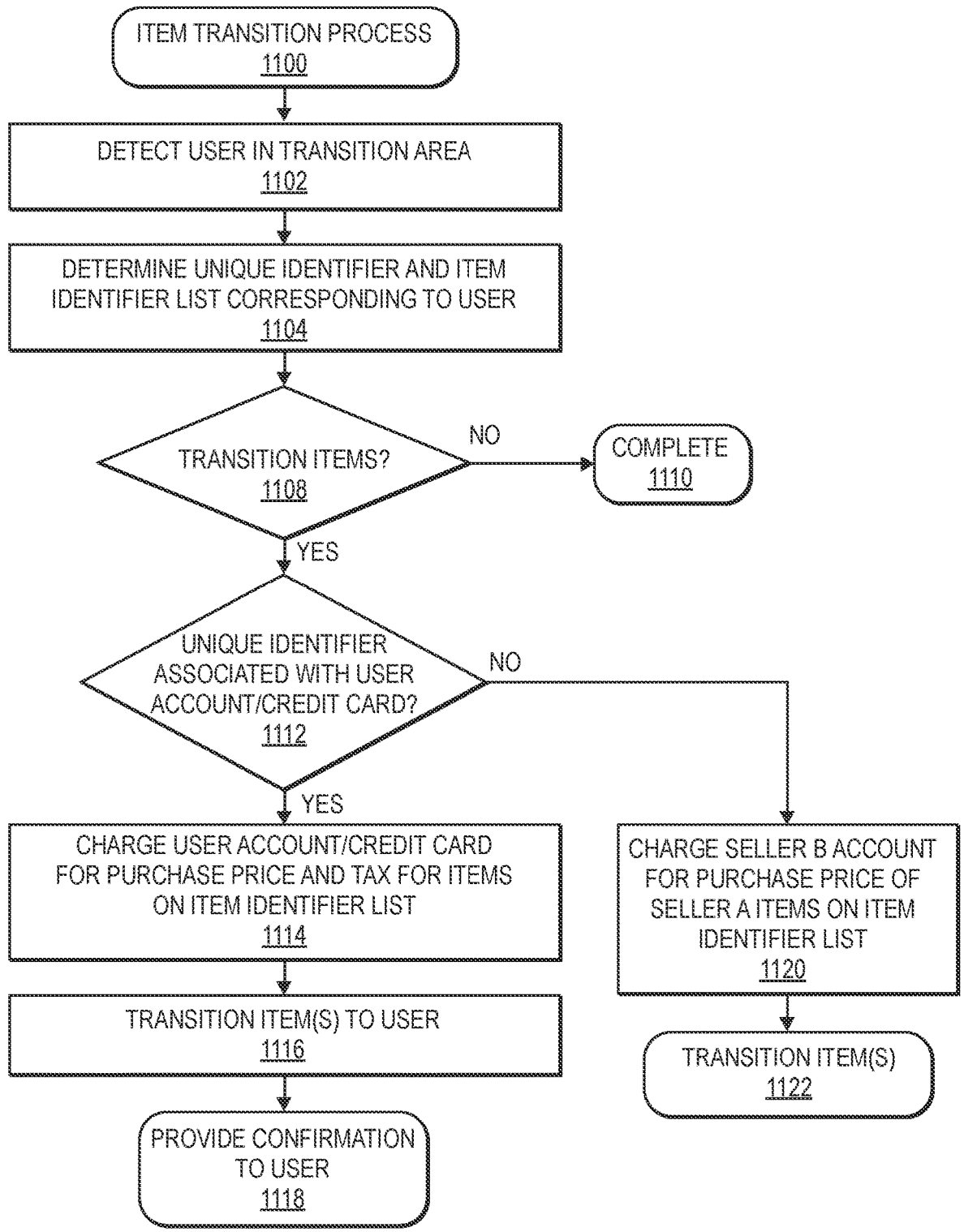
FIG. 11 depicts a flow diagram of an example item transition process, according to some implementations.

FIG. 11 depicts a flow diagram of an example item transition process 1100, according to some implementations. The example item transition process 1100 may correspond to the example discussed above with respect to FIGS. 9 and 10 in which the facility includes a two-seller environment (Seller A and Seller B) and in which Seller B provides in-facility purchase of items (Seller A items and/or Seller B items).

The example process 1100 begins by detecting a user entering or passing through a transition area, as in 1102. For example, if the transition area is an exit of a materials handling facility, one or more cameras and/or other input devices, such as an RFID reader, may be located at or near the transition area and collect data (e.g., images, RFID tag identifiers, etc.) that is processed to determine that a user is entering and/or passing through the transition area. Alternatively, or in addition thereto, the position or location of the user may be monitored as the user progresses through the materials handling facility. It may then be determined that the user has entered or passed through a transition area based on the monitored position of the user.

Upon detecting a user entering and/or passing through a transition area, the unique identifier corresponding to the user and the item identifier list associated with that unique identifier are determined, as in 1104. As discussed above, when a user enters the facility, the user may be authenticated or specify that the user prefers in-facility purchase and a unique identifier generated that corresponds to the object that is the user and that is used to monitor the position of the object that is the user while the user is located within the materials handling facility, without having to use any user identifiable information. Likewise, the user identifier list may be associated with the unique identifier.

A determination may be made as to whether the items included on the item identifier list are to be transitioned, as in 1108. As discussed above, transitioning the items may include charging a fee to the user for the purchase, rental, lease, etc., of the items, appropriate taxes for the items, decreasing an inventory count of the materials handling facility for the items, updating the user account associated with the user to identify that the item has been transitioned to the user, transferring ownership and/or control of the items to the user, transitioning inventory between Seller B and Seller A for in-facility purchased items, payment of the purchase price between Seller B and Seller A for in-facility purchased items, etc.

In some implementations, the determination as to whether to transition the items may be determined based on data collected by input devices that is processed to determine whether the user has the items with them as they enter or pass through the transition area and/or if they have consumed or otherwise used the items. For example, if the user was placing picked items into a tote and then leaves the tote in the materials handling facility as they pass through the transition area, data may be collected by input devices and used to determine that the items are not to be transitioned to the user. In contrast, if the user passes through a transition area with the items identified on the item identifier list, data collected by the input devices may be used to determine that the items are to be transitioned to the user. In another example, if the items picked by the user have been paid for by the user through an in-facility purchase of the items, the user may not be charged again for the items but payment for the items and appropriate inventory adjustments may be made between Seller A and Seller B for the items picked and purchased by the user. In another example, if the user decides they do not want the items and/or the user is not going to take the items with them as they pass through the transition area, the user may identify that the items are not going through the transition area and are not to be transitioned.

If it is determined that the items are not to be transitioned, the example process 1100 completes, as in 1110. In some implementations, the item identifiers included on the item identifier list associated with the user may be removed from the item identifier list and/or the item identifier list may be disassociated from the user and/or a user profile associated with the user.

If it is determined that the items are to be transitioned to the user, a determination may be made as to whether the unique identifier for the user is associated with a user account, credit card, or other payment instrument, as in 1112. If it is determined that the unique identifier is not associated with a user account, credit card, or other payment instrument (i.e., the unique identifier is associated with an in-purchase identifier), the items indicated on the item identifier list have already been paid for by the user as part of an in-facility purchase with Seller B, Seller B may be charged or otherwise caused to make payment to Seller A for at least a portion of the purchase price of the items indicated on the item identifier list, as in 1120.

In implementations in which the item identifier list 1000 (FIG. 10) has been updated to indicate which items have actually been in-facility purchased by the user, it may be verified that the user has completed an in-facility purchase for all items indicated on the item identifier list before the user is allowed to transition from the facility. Alternatively, it may be the responsibility of Seller B to verify that all items have been purchased by the user before the user transitions from the facility. In such an example, as noted above, the item identifier list 1000 need not be updated to indicate that in-facility purchase has been completed and Seller B may be charged or otherwise caused to make payment to Seller A for at least a portion of the purchase price of the items indicated on the item identifier list when the user passes through the transition area.

In some implementations, the purchase price paid by the user for the items and the purchase price paid by Seller B to Seller A may be equivalent. In other implementations, the purchase price paid for the items indicated on the item identifier list paid by the user and the purchase price paid by Seller B to Seller A may be different. For example, in some implementations, the purchase price paid by Seller B to Seller A may be less than the purchase price paid by the user to account for the use of the Seller B associate in conducing the in-facility purchase. In other examples, such as those in which Seller A is also providing the disclosed implementations, the purchase price paid by Seller B to Seller A may be greater than the purchase price paid by the user to Seller B to account for the use and benefits of the disclosed implementations.

Finally, the item(s) indicated on the item identifier list may be transitioned, as in 1122. For example, an inventory accounting between Seller A, Seller B, and the user may be updated to deduct the items from Seller A's inventory, temporarily increase the inventory of Seller B for the items, and subsequently decrement Seller B's inventory for transition of the items from Seller B to the user, such that Seller B is the retail Seller of Record.

Returning to decision block 1112, if it is determined that the unique identifier of the user is associated with a user account, credit card, or other payment instrument, the user account or other payment instrument (e.g., credit card, debit card, etc.) associated with the unique identifier generated for the user is charged for the purchase price and applicable taxes for the items indicated on the item identifier list, as in 1114. Likewise, the item(s) indicated on the item identifier list are transitioned to the user such that Seller A is the seller of record, as in 1116. Transition of items may include updating the user profile or user account of the user to indicate the purchase of the item indicated on the item identifier list and/or decrementing a Seller A inventory count for the items indicated on the item identifier list. In some implementations, a confirmation, such as an email or other notification may be sent to the user confirming the transition of the items to the user, as in 1118.

As discussed above, from the user perspective, transition of items is done automatically in response to a determination that the user has entered and/or passed through a transition area. Likewise, the transition is done without stopping or otherwise delaying the user as they pass through the transition area.

FIG. 12 is a block diagram of another item identifier list 1200, according to some implementations. Similar to the discussion above, the item identifier list 1200 corresponds to an example two-seller environment in which two sellers (e.g., Seller A and Seller B) each offer items for sale within the facility. However, in comparison to the discussion above, in some implementations, the user may pick items offered for sale at the facility by Seller A and/or items offered for sale at the facility by Seller B and in-facility purchase some, all, or none of those items from Seller B. In such an implementation, as the items are picked, the example process 500 (FIG. 5) identifies the picked item as well as the seller of the picked item and includes in the item identifier list corresponding to the unique identifier of the user, the corresponding item identifier and optionally the seller identifier, as discussed above, as illustrated in FIG. 12.

In the example item identifier list 1200, which is associated with a unique identifier 1202 of a user, the user has picked one quantity of item 1 1201-1 that is offered for sale within the facility by Seller A 1205-1, one quantity of item 2 1201-2 that is offered for sale within the facility by Seller A 1205-1, and one quantity of item 3 1201-3 that is offered for sale within the facility by Seller B 1205-2. As illustrated, any number of items 1201 through item N 1201-N and any quantity 1003 of items offered by either Seller A 1205-1 or Seller B 1205-2 may be picked by the user while located in the materials handling facility and added to the item identifier list 1200, as discussed above.

As discussed below with respect to FIG. 13, in some implementations, a user may decide to in-facility purchase some, all, or none of the items picked by the user and indicated on the item identifier list 1200.

Figure 13:
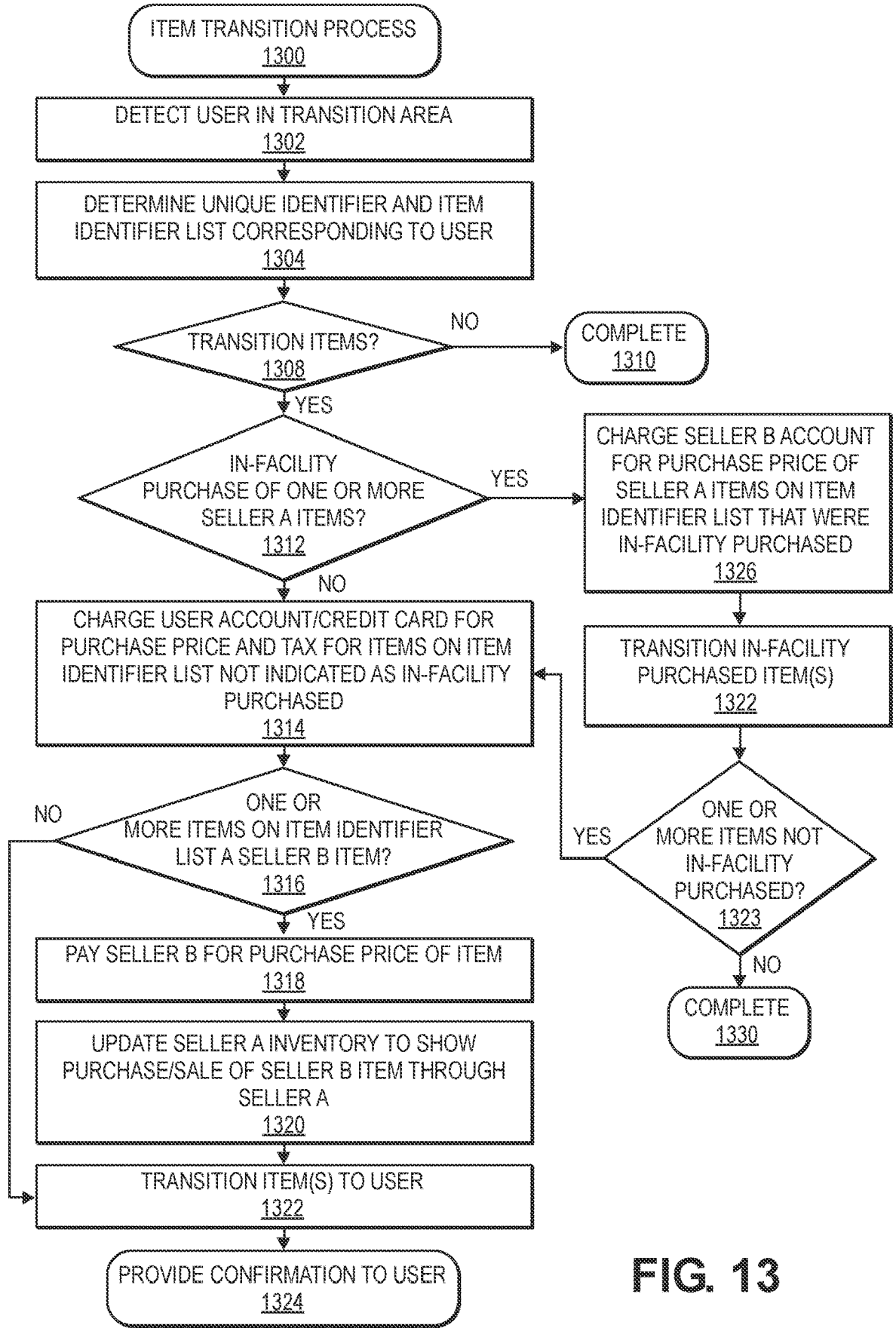
FIG. 13 is another example item transition process, according to some implementations.

FIG. 13 is another example item transition process 1300, according to some implementations. The example item transition process 1300 may correspond to the example discussed above with respect to FIG. 12 in which the facility includes a two-seller environment (Seller A and Seller B), in which Seller B provides in-facility purchase of items (Seller A items and/or Seller B items), and the user may complete an in-facility purchase of some, all, or none of the items picked by the user while the user is in the facility.

The example process 1300 begins by detecting a user entering or passing through a transition area, as in 1302. For example, if the transition area is an exit of a materials handling facility, one or more cameras and/or other input devices, such as an RFID reader, may be located at or near the transition area and collect data (e.g., images, RFID tag identifiers, etc.) that is processed to determine that a user is entering and/or passing through the transition area. Alternatively, or in addition thereto, the position or location of the user may be monitored as the user progresses through the materials handling facility. It may then be determined that the user has entered or passed through a transition area based on the monitored position of the user.

Upon detecting a user entering and/or passing through a transition area, the unique identifier corresponding to the user and the item identifier list associated with that unique identifier are determined, as in 1304. As discussed above, when a user enters the facility, the user may be authenticated or specify that the user prefers in-facility purchase and a unique identifier generated that corresponds to the object that is the user and that is used to monitor the position of the object that is the user while the user is located within the materials handling facility, without having to use any user identifiable information. Likewise, the user identifier list may be associated with the unique identifier.

A determination may then be made as to whether the items included on the item identifier list are to be transitioned, as in 1308. As discussed above, transitioning the items may include charging a fee to the user for the purchase, rental, lease, etc., of the items, appropriate taxes for the items, decreasing an inventory count of the materials handling facility for the items, updating the user account associated with the user to identify that the item has been transitioned to the user, transferring ownership and/or control of the items to the user, transitioning inventory between Seller B and Seller A for in-facility purchased items, payment of the purchase price between Seller B and Seller A for in-facility purchased items, etc.

In some implementations, the determination as to whether to transition the items may be determined based on data collected by input devices that is processed to determine whether the user has the items with them as they enter or pass through the transition area and/or if they have consumed or otherwise used the items. For example, if the user was placing picked items into a tote and then leaves the tote in the materials handling facility as they pass through the transition area, data may be collected by input devices and used to determine that the items are not to be transitioned to the user. In contrast, if the user passes through a transition area with the items identified on the item identifier list, data collected by the input devices may be used to determine that the items are to be transitioned to the user. In another example, if the items picked by the user have been paid for by the user through an in-facility purchase of the items, the user may not be charged again for the items but payment for the items and appropriate inventory adjustments may be made between Seller A and Seller B for the items picked and purchased by the user. In another example, if the user decides they do not want the items and/or the user is not going to take the items with them as they pass through the transition area, the user may identify that the items are not going through the transition area and are not to be transitioned.

If it is determined that the items are not to be transitioned, the example process 1300 completes, as in 1310. In some implementations, the item identifiers included on the item identifier list associated with the user may be removed from the item identifier list and/or the item identifier list may be disassociated from the user and/or a user profile associated with the user.

If it is determined that the items are to be transitioned to the user, a determination may be made as to whether an in-facility purchase of one or more items indicated on the item identifier list that are offered for sale by Seller A has been completed, as in 1312. As discussed above, in the example discussed with respect to FIG. 12, the materials handling facility is a two-seller facility in which Seller B offers in-facility purchase of items offered for sale by either Seller A or Seller B and the user may perform an in-facility purchase of some, all, or none of the items picked by the user while the user is located in the facility. If one or more items are in-facility purchased, as illustrated in FIG. 12, the item identifier list may be updated to indicate which of the items were in-facility purchased. For example, referring back to FIG. 12, in the illustrated example, the user has completed an in-facility purchase of item 2 1201-2, as indicted by marker 1209-1. In other implementations, other indicators may be maintained to indicate that payment for the one or more items indicated on the item identifier list have already been made by the user as part of an in-facility purchase.

If it is determined that one or more of the items indicated on the item identifier list that are offered for sale by Seller A have already been paid for by the user as part of an in-facility purchase with Seller B, Seller B may be charged or otherwise caused to make payment to Seller A for at least a portion of the purchase price of those items, as in 1320. In some implementations, the purchase price paid by the user for the items and the purchase price paid by Seller B to Seller A may be equivalent. In other implementations, the purchase price paid for the items indicated on the item identifier list paid by the user and the purchase price paid by Seller B to Seller A may be different. For example, in some implementations, the purchase price paid by Seller B to Seller A may be less than the purchase price paid by the user to account for the use of the Seller B associate in conducing the in-facility purchase. In other examples, such as those in which Seller A is also providing the disclosed implementations, the purchase price paid by Seller B to Seller A may be greater than the purchase price paid by the user to Seller B to account for the use and benefits of the disclosed implementations.

Additionally, the item(s) indicated on the item identifier list that were in-facility purchased may be transitioned, as in 1322. For example, an inventory accounting between Seller A, Seller B, and the user may be updated to deduct the items from Seller A's inventory, temporarily increase the inventory of Seller B for the items, and subsequently decrement Seller B's inventory for transition of the items from Seller B to the user, such that Seller B is the retail seller of record for each of the in-facility purchased items.

A determination may also be made as to whether one or more items indicted on the item identifier list were not in-facility purchased, as in 1323. If it is determined that all items on the item identifier list were in-facility purchased, the example process 1300 completes, as in 1330.

If it is determined at decision block 1323 that one or more items on the item identifier list were not in-facility purchased, or if it is determined at decision block 1312 that no in-facility purchase occurred, the user account or other payment instrument associated with the unique identifier of the user is charged the purchase price and applicable taxes for items indicated on the item identifier list that were not in-facility purchased, as in 1314.

A determination may then be made as to whether one or more of the items on the item identifier list that were not in-facility purchased are items offered for sale by Seller B within the facility, as in 1316. If it is determined that one or more of the items on the item identifier list that were not in-facility purchased are offered for sale by Seller B, Seller B may be paid at least a portion of the purchase price for each of those items, as in 1318. For example, the user account that is charged the purchase price and the applicable taxes for the items is associated with Seller A, such that Seller A is the retail seller of record for the Seller B items, Seller A may pay Seller B at least a portion of the purchase price for each of the Seller B items indicted on the item identifier list that were not in-facility purchased. As discussed above, in some implementations, the purchase price paid by the user may be the same as the purchase price paid by Seller A to Seller B. In other examples, the purchase price paid by the user may be different than the purchase price paid by Seller A to Seller B.

In addition, Seller A inventory for the Seller B items may be temporarily incremented to indicate the transition of the item from Seller B to Seller A, as in 1320. In addition to updating the Seller A inventory at block 1320, or if it is determined at decision block 1316 that no items in the item identifier list are Seller B items, the item(s) indicated on the item identifier list are transitioned to the user, as in 1322. Transition of items may include updating the user profile or user account of the user to indicate the purchase of the items indicated on the item identifier list. Likewise, the Seller A inventory may be updated to decrement the inventory count for the items indicated on the item identifier list. In some implementations, a confirmation, such as an email or other notification may be sent to the user confirming the transition of the items to the user, as in 1324.

As discussed above, from the user perspective, transition of items is done automatically in response to a determination that the user has entered and/or passed through a transition area. Likewise, the transition is done without stopping or otherwise delaying the user as they pass through the transition area.

Figure 14:
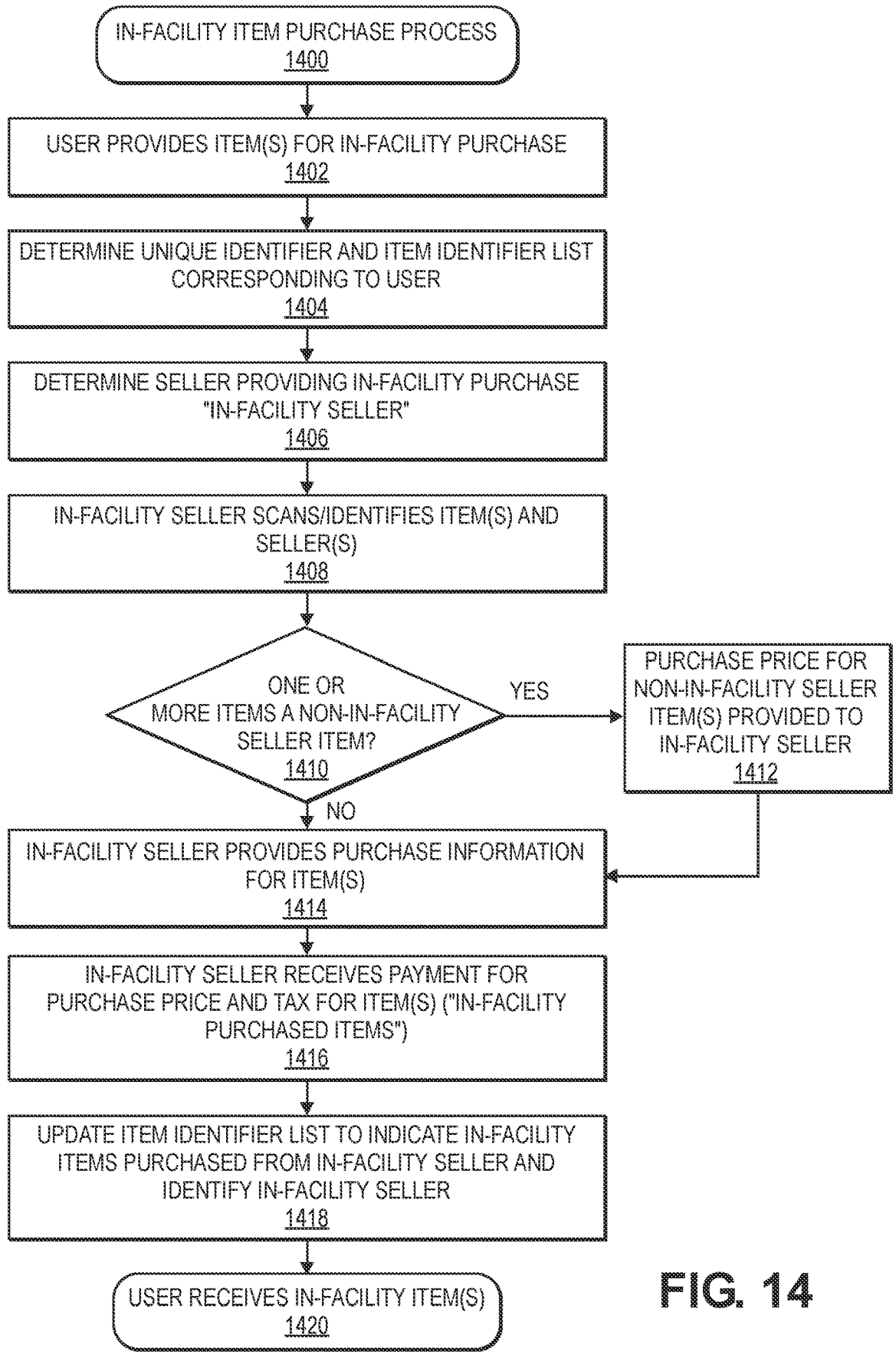
FIG. 14 is another example in-facility item purchase process, according to some implementations.

FIG. 14 is another example in-facility item purchase process 1400, according to some implementations. The example process 1400 may be performed for any user located within the facility, regardless of whether the user indicated at the access point that they prefer in-facility purchase of items. In addition, as discussed further below, the in-facility item purchase 1400 may be performed by any seller within the facility and any number of sellers may be located in the facility and selling one or more items in the facility. For example, as discussed above with respect to FIG. 1B the facility may include Seller A, Seller B, Seller C, Seller D, etc.

The example process 1400 begins when a user provides one or more items picked by the user while located in the facility to any of the sellers within the facility or to a self-service kiosk within the facility that is associated with a seller within the facility for in-facility purchase, as in 1402. As also discussed above, when the user picks one or more items from an inventory location within the facility, the one or more items are determined, along with the seller(s) of those one or more items, and an item identifier of each of the one or more items, and optionally the seller(s) of those items, are included on an item identifier list associated with the unique identifier corresponding to the user.

Upon receipt of the one or more items provided by the user for in-facility purchase, the unique identifier of the user and the item identifier list are determined, as in 1404. As discussed above, the unique identifier for the user may be associated with the object that is the user and utilized to monitor the position of the user as the user moves about the facility, all without the need or use of user identifiable information. Likewise, the item identifier list may be associated with the unique identifier. Accordingly, as the user that is providing items for in-facility purchase the unique identifier may be known/determined based on the position of the user.

In addition, the seller providing the in-facility purchase, referred to herein as the in-facility seller may be determined, as in 1406. For example, defined locations within the facility may be specified for different sellers and/or kiosks of different sellers to enable in-facility purchase. In such an example, the in-facility seller may be determined based on the position of the user. In other examples, the position of associates of each of the different sellers may be monitored in a manner similar to the position of users within the facility and the in-facility seller determined based on the position of the associate with respect to the seller and the seller to which that associate corresponds.

The in-facility seller scans or otherwise identifies the provided item(s) and the seller of the provided item(s), as in 1408. For example, an in-facility seller may scan, using a computing device, scanner, etc., a barcode or other identifier included on each of the one or more items to determine an identity of each of the one or more items. In other examples, the inventory management system may provide to the in-facility seller an indication of the items picked by the user, as indicated on the item identifier list. In still another example, image processing of the items provided by the user to the in-facility seller may be performed to identify the items and the identity of those items provided to the in-facility seller. In still other examples, if the user is located at a self-service kiosk, the user may scan the items to identify each of the items. Likewise, as discussed above, when the user picks an item from an inventory location, the item and the seller of the item may be determined. Accordingly, upon identification of the item, the seller of the item may also be determined as it is already associated with the item.

Upon identification of the one or more items and the seller of those item(s), a determination may be made as to whether one or more of the one or more items is an item offered for sale (or rent, lease, etc.) within the facility by a non-in-facility seller, a non-in-facility seller item, as in 1410.

If it is determined that one or more of the provided items is a non-in-facility seller item, the purchase price for those non-in-facility seller item(s) is provided to the in-facility seller, as in 1412. In some implementations, the purchase price for non-in-facility seller items may already be available to the in-facility seller. In such examples, block 1412 may be omitted.

The in-facility seller may then provide purchase information for the provided item(s), whether those items are items offered for sale by the in-facility seller or offered for sale by one or more non-in-facility sellers, as in 1414. Purchase information may include, but is not limited to, the item identifiers for the provided items, the purchase price for the provided items, the appropriate taxes for the provided items, the total price with tax for the one or more provided items, etc.

The in-facility seller may then receive payment for the purchase price of the provided items and the appropriate taxes for the provided items, such that the items are in-facility purchased items, as in 1416. In addition, the item identifier list associated with the unique identifier for the user may be updated to indicate which items included on the item identifier list are in-facility purchased items, as in 1418. In addition, after payment for the in-facility purchased items is complete, the user receives the in-facility purchased items, as in 1420. The user may then exit the facility, go to the lounge to enjoy/consume the items, or otherwise remain in the facility.

FIG. 15 is a block diagram of another item identifier list 1500, according to some implementations. The item identifier list 1500 may correspond to the examples discussed with respect to FIGS. 14 and 16 in which the facility may include any number of sellers selling items within the facility and the user may select to in-facility purchase some, none, or all of the items, from any of the sellers, through an in-facility purchase.

In the illustrated example item identifier list 1500 illustrated in FIG. 15, which is associated with a unique identifier 1502 of a user, indicating that the user has picked one quantity of item 1 1501-1 that is offered for sale within the facility by Seller A 1505-1, one quantity of item 2 1501-2 that is offered for sale within the facility by Seller A 1505-1, one quantity of item 3 1501-3 that is offered for sale within the facility by Seller B 1505-2, three quantities of item 4 1501-4 that is offered for sale within the facility by Seller C 1505-3, two quantities of item 5 1501-5 that is offered for sale within the facility by Seller A 1505-1, two quantities of item 6 1501-6 that is offered for sale within the facility by Seller C 1505-3, one quantity of item 7 1501-7 that is offered for sale within the facility by Seller B 1505-2, through X quantities of item N 1501-N that is offered for sale by Seller Y 1505-Y. As illustrated, any number of items 1501 and any quantity 1503 of items offered for sale within the facility by any number of sellers may be picked by the user while located in the materials handling facility and added to the item identifier list 1500, as discussed above.

In addition, in this example, the item identifier list 1500 may be updated to indicate which items are in-facility purchased items, such as items 2 1501-2, item 4 1501-4, item 5 1501-5, and item 7 1501-7. For example, indicators 1509 may be included in the item identifier list 1500 to indicate which items on the item identifier list 1500 were in-facility purchased by the user while the user was located within the facility. In addition, the item identifier list 1500 may be updated to indicate the seller that was the in-facility seller 1506 involved in the in-facility purchase of items by the user. In this example, Seller B is identified as the in-facility seller for item 2 1501-2, items 4 1501-4, items 5 1501-5, and item 7 1501-7. In other implementations, in addition to or as an alternative to updating the item identifier list 1500, the indication of in-facility purchase items and/or the indication of the in-facility seller may be maintained by the inventory management system in other locations, such as in an in-facility purchase data store, and associated with the unique identifier of the user.

Figure 16A:
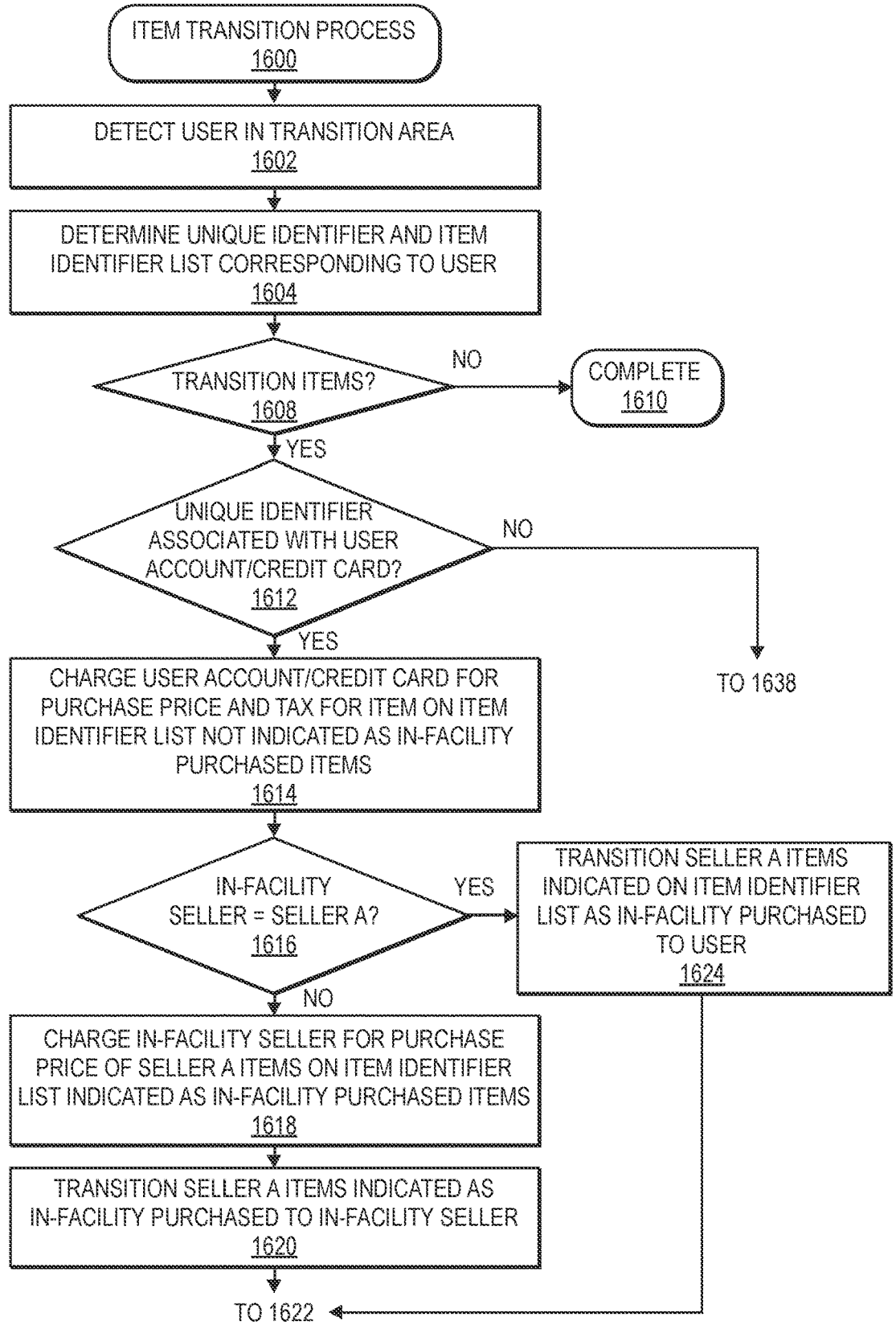
FIGS. 16A through 16C is another example item transition process, according to some implementations.
Figure 16B:
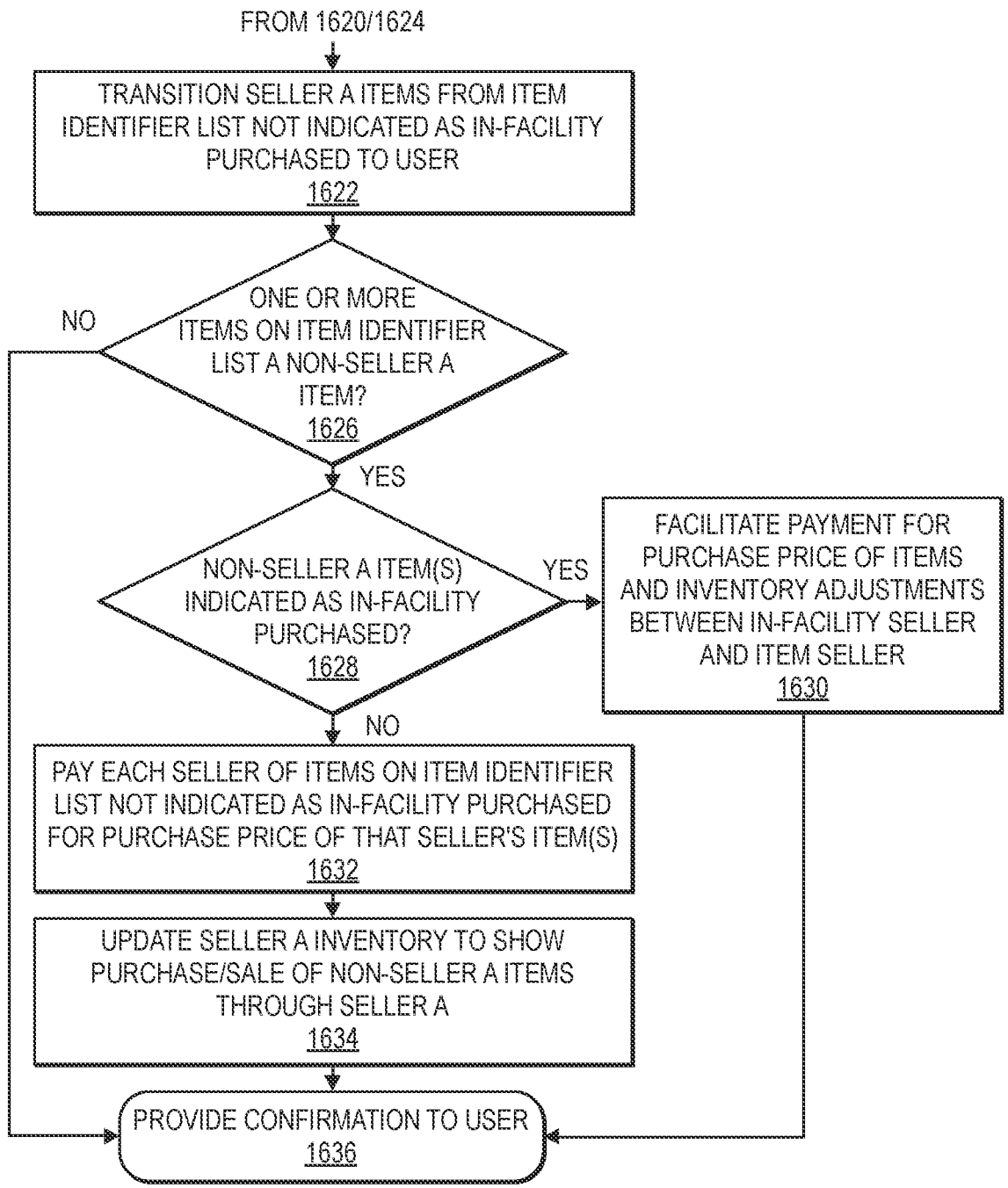
Figure 16C:
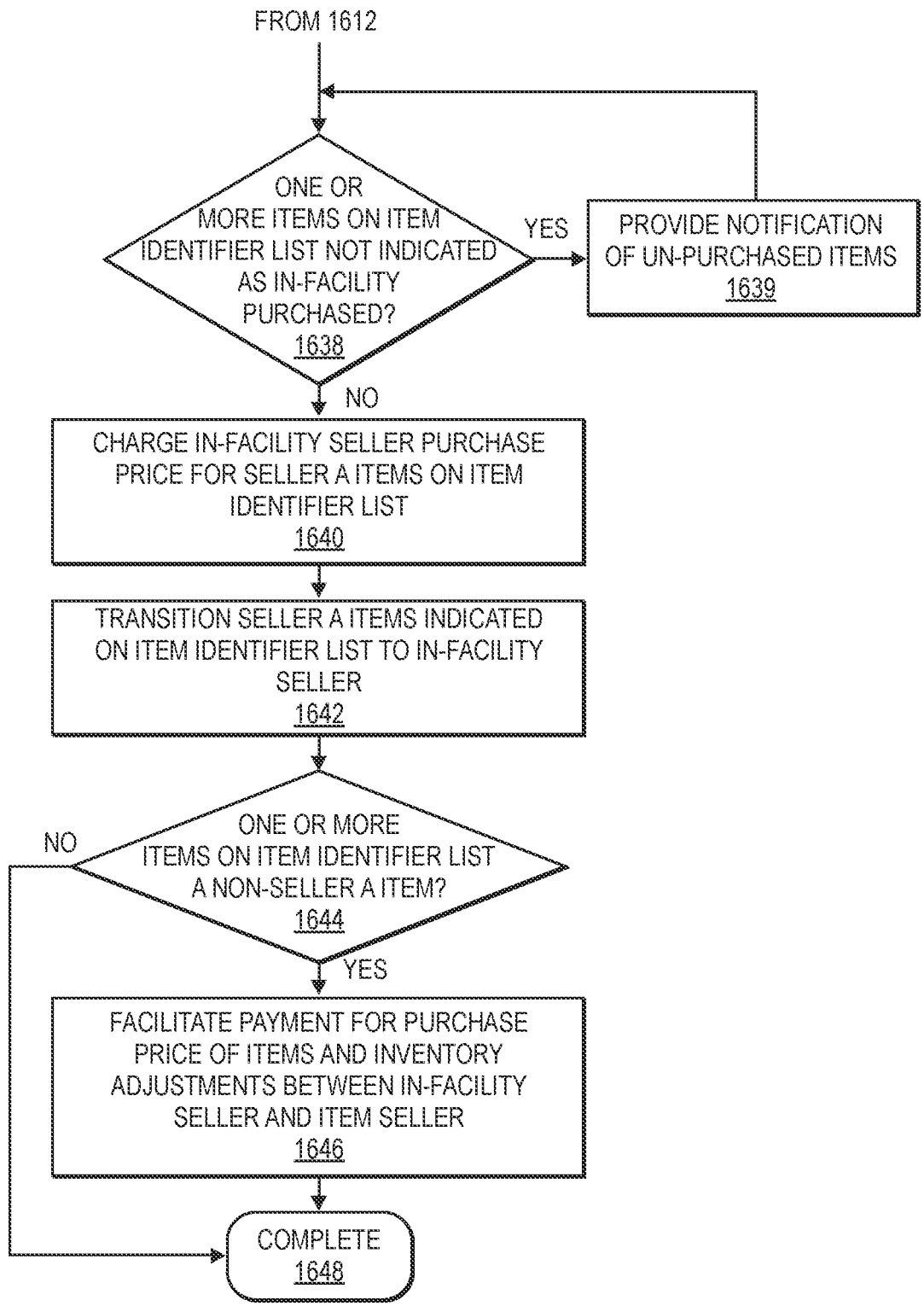

FIGS. 16A through 16C is another example item transition process 1600, according to some implementations. The example process 1600 may be utilized in a facility with any number of sellers that sell items within the facility and in which any of the sellers may be the in-facility seller involved in an in-facility purchase of one or more items by the user, as discussed above, and in which the user may in-facility purchase some, all, or none of the items picked by the user.

The example process 1600 begins by detecting a user entering or passing through a transition area, as in 1602. For example, if the transition area is an exit of a materials handling facility, one or more cameras and/or other input devices, such as an RFID reader, may be located at or near the transition area and collect data (e.g., images, RFID tag identifiers, etc.) that is processed to determine that a user is entering and/or passing through the transition area. Alternatively, or in addition thereto, the position or location of the user may be monitored as the user progresses through the materials handling facility. It may then be determined that the user has entered or passed through a transition area based on the monitored position of the user.

Upon detecting a user entering and/or passing through a transition area, the unique identifier corresponding to the user and the item identifier list associated with that unique identifier are determined, as in 1604. As discussed above, when a user enters the facility, the user may be authenticated or specify that the user prefers in-facility purchase and a unique identifier generated that corresponds to the object that is the user and that is used to monitor the position of the object that is the user while the user is located within the materials handling facility, without having to use any user identifiable information. Likewise, the user identifier list may be associated with the unique identifier.

A determination may then be made as to whether the items included on the item identifier list are to be transitioned, as in 1608. As discussed above, transitioning the items may include charging a fee to the user for the purchase, rental, lease, etc., of the items, appropriate taxes for the items, decreasing an inventory count of the materials handling facility for the items, updating the user account associated with the user to identify that the item has been transitioned to the user, transferring ownership and/or control of the items to the user, transitioning inventory between the in-facility seller and a seller of the in-facility purchased item(s), payment of the purchase price between the in-facility seller and a seller for an in-facility purchased item, etc.

In some implementations, the determination as to whether to transition the items may be based on data collected by input devices that is processed to determine whether the user has the items with them as they enter or pass through the transition area and/or if they have consumed or otherwise used the items. For example, if the user was placing picked items into a tote and then leaves the tote in the materials handling facility as they pass through the transition area, data may be collected by input devices and used to determine that the items are not to be transitioned to the user. In contrast, if the user passes through a transition area with the items identified on the item identifier list, data collected by the input devices may be used to determine that the items are to be transitioned to the user. In another example, if the items picked by the user have been paid for by the user through an in-facility purchase of the items, the user may not be charged again for the items but payment for the items and appropriate inventory adjustments may be made between sellers for the items picked and purchased by the user. In another example, if the user decides they do not want the items and/or the user is not going to take the items with them as they pass through the transition area, the user may identify that the items are not going through the transition area and are not to be transitioned.

If it is determined that the items are not to be transitioned, the example process 1600 completes, as in 1610. In some implementations, the item identifiers included on the item identifier list associated with the user may be removed from the item identifier list and/or the item identifier list may be disassociated from the user and/or a user profile associated with the user.

If it is determined that the items are to be transitioned to the user, a determination may be made as to whether the unique identifier is associated with a user account, credit card, or other payment instrument, as in 1612. As discussed above, for users that authenticate at the access point, a unique identifier is generated and associated with the object that is the user, an item identifier list and the user account, credit card, or other payment instrument. If the user does not authenticate, the user may access the facility by indicating that they prefer in-facility purchase. For in-facility purchase, an in-facility purchase identifier may be associated with the unique identifier instead of a user account, credit card, or other payment instrument.

If it is determined that the unique identifier corresponds to a user account, credit card, or other payment instruments, that user account, credit card, or other payment instrument may be charged the purchase price and applicable taxes for any items indicated on the item identifier list that were not in-facility purchased, as in 1614. For example, referring back to the item identifier list 1500 (FIG. 15), when the user corresponding to the unique identifier 1502 enters or moves through a transition area, it is determined that the unique identifier is associated with a user account and that user account is charged the purchase price and any applicable taxes for items not indicated as in-facility purchased. In this example, the user account associated with the unique identifier 1502 would be charged the purchase price and applicable taxes for item 1 1501-1, item 3 1501-3, items 6 1501-6, and item(s) N 1501-N.

A determination may then be made as to whether the in-facility seller is Seller A, as in 1616. As noted above, an in-facility purchase may be performed by any seller within the facility, the disclosed implementations may determine the seller involved in the in-facility purchase and, in some implementations, the indication of the in-facility seller may be included on the item identifier list, as illustrated in the item identifier list 1500 (FIG. 15). In other implementations, the inventory management system may otherwise maintain the indication of the in-facility seller.

If it is determined that the in-facility seller is Seller A, any Seller A items indicated on the item identifier list as in-facility purchased are transferred to the user, as in 1624. As discussed above, transfer of items to the user may include updating the user profile or purchase history of the user to indicate the purchase of the items, decrement the inventory of Seller A for the transfer of those items, etc.

If it is determined that the in-facility seller is not Seller A, the in-facility seller is charged for at least a portion of the purchase price of Seller A items indicated on the item identifier list as in-facility purchased items, as in 1618. Those Seller A items may then be transitioned from Seller A to the in-facility seller, as in 1620. Transition of Seller A items from Seller A to the in-facility seller may include decrementing the Seller A inventory for those items and providing an indication to the in-facility seller of the items that were transitioned to the in-facility seller.

Referring to FIG. 16B, after transitioning the Seller A items indicated as in-facility purchased to either the user (1624) or the in-facility seller (1620), the Seller A items indicated on the item identifier list that were not indicated as in-facility purchased are transitioned to the user, as in 1622.

A determination may also be made as to whether one or more items on the item identifier list are non-Seller A items, as in 1626. If it is determined that one or more of the items indicated on the item identifier list are non-Seller A items, a determination is made as to whether those non-Seller A items where in-facility purchased, as in 1628. If it is determined that one or more of the non-Seller A items were in-facility purchased, payment for at least a portion of the purchase price between the in-facility seller and the seller of the item and inventory adjustments for the item are facilitated, as in 1630. For example, if the in-facility seller is Seller A, Seller A may make a non-taxed payment to the seller of the non-Seller A item that was in-facility purchased to the seller of that item. In comparison, if the in-facility seller is a seller other than Seller A, the example process may provide a notification to the in-facility seller and the seller of the item indicating the in-facility purchase of the item and that the in-facility seller is to pay the seller of the item at least a portion of the received purchased price and that inventory adjustments are to be performed.

As discussed above, the purchase price made by the user for the in-facility purchase and the purchase price paid by the in-facility seller to the seller may be the same or different.

Returning to decision block 1628, if it is determined that one or more of the non-Seller A items indicated on the item identifier list are not in-facility purchased, payment of at least a portion of the purchase price may be made from Seller A to each seller of items indicated on the item identifier list that are not indicated as in-facility purchased, as in 1632. Likewise, Seller A inventory may be updated to indicate the transition of the non-Seller A items to Seller A and the subsequent transition of those items from Seller A to the user, as in 1634, such that Seller A is the seller of record for the non-in-facility purchased items.

Finally, after updating the Seller A inventory in block 1634, after facilitating payment in block 1630, or if it is determined at decision block 1626 that one or more items indicated on the item identifier list are not non-Seller A items, a confirmation indicating the sale of the items may be provided to the user, as in 1636. The confirmation may be an email, text message, etc., and may indicate the items transitioned to the user, the method of payment, the total purchase price, etc.

Referring now to FIG. 16C, if it is determined at decision block 1612 (FIG. 16A) that the unique identifier is not associated with a user account, credit card, or other payment instrument (i.e., the user has indicated in-facility purchase preference), a determination is made as to whether one or more items on the item identifier list are not indicated as in-facility purchased, as in 1638. If it is determined that one or more items on the item identifier list are not indicated as in-facility purchased and because the user has indicated a preference for in-facility purchased and has not been authenticated, a notification may be provided to the user, and/or an associate, indicating the un-purchased item(s) that were picked by the user while the user was located in the facility, as in 1639, and the example process may return to block 1638 and continue.

If it is determined that all the items indicated on the item identifier list have been in-facility purchased, the in-facility seller may be charged at least a portion of the purchase price for any items indicated on the item identifier list that are Seller A items, as in 1640. Likewise, those Seller A items are transitioned from Seller A to the in-facility seller, as in 1642. If Seller A is the in-facility seller, blocks 1640 and 1642 may be omitted.

A determination may also be made as to whether one or more items indicated on the item identifier list are non-Seller A items, as in 1644. If one or more of the items on the item identifier list that were not in-facility purchased are non-Seller A items, payment for the purchase price for those items, and corresponding inventory transitions, between the in-facility seller and the seller(s) of those items may be facilitated, as in 1646. Finally, the example process 1600 completes, as in 1648.

Figure 17:
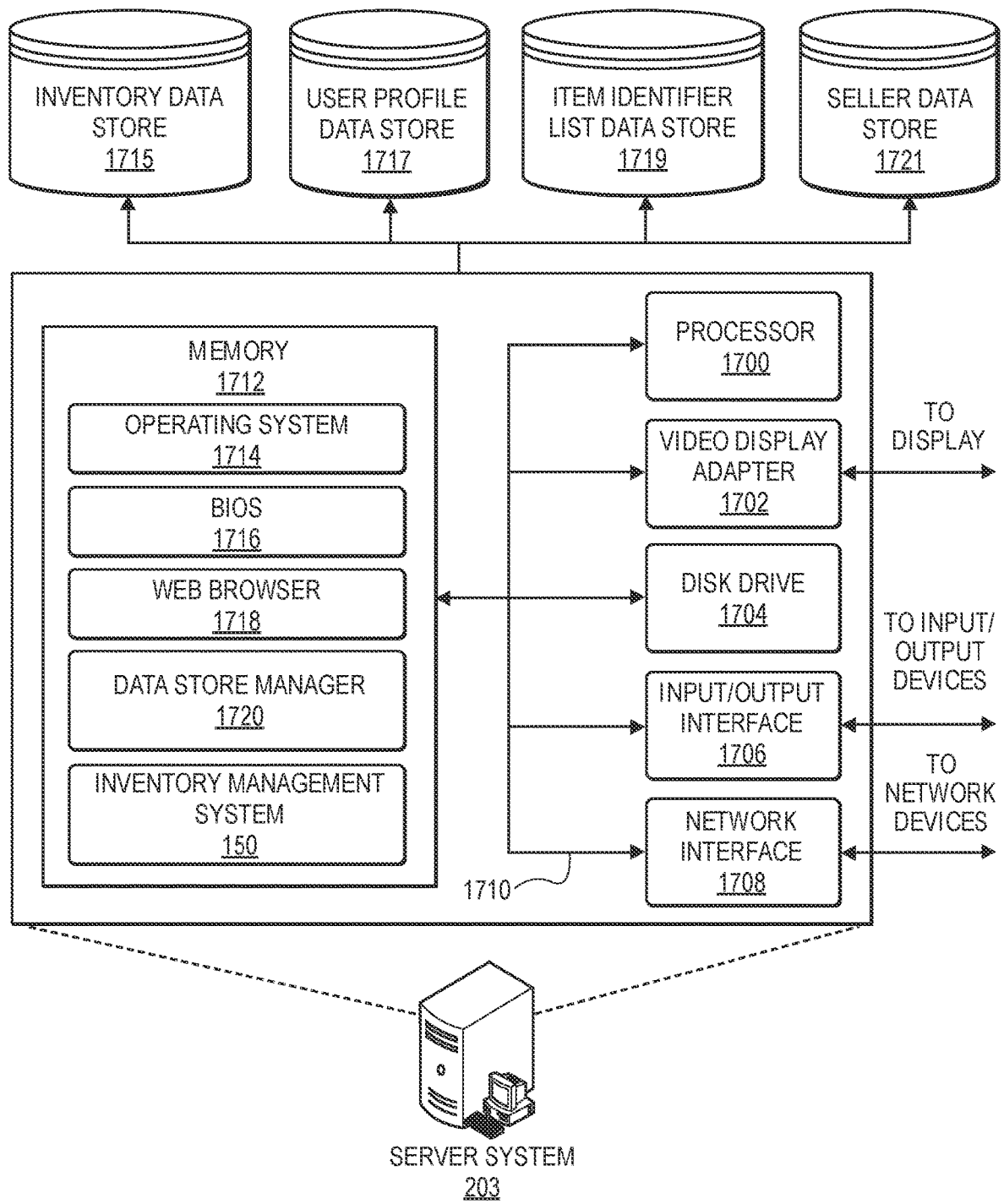
FIG. 17 is a block diagram of an illustrative implementation of a server system that may be used with various implementations, such as the remote computing resources.

FIG. 17 is a pictorial diagram of an illustrative implementation of a server system, such as the remote computing resource 203, that may be used in the implementations described herein. The remote computing resource 203 may include a processor 1700, such as one or more redundant processors, a video display adapter 1702, a disk drive 1704, an input/output interface 1706, a network interface 1708, and a memory 1712. The processor 1700, the video display adapter 1702, the disk drive 1704, the input/output interface 1706, the network interface 1708, and the memory 1712 may be communicatively coupled to each other by a communication bus 1710.

The video display adapter 1702 provides display signals to a local display (not shown in FIG. 17) permitting an operator of the server system 203 to monitor and configure operation of the server system 203. The input/output interface 1706 likewise communicates with external input/output devices not shown in FIG. 17, such as a mouse, keyboard, scanner, or other input and output devices that can be operated by an operator of the remote computing resource 203. The network interface 1708 includes hardware, software, or any combination thereof, to communicate with other computing devices. For example, the network interface 1708 may be configured to provide communications between the server system 203 and other computing devices via a network 202, such as the Internet, as shown in FIG. 2.

The memory 1712 generally comprises random access memory (RAM), read-only memory (ROM), flash memory, and/or other volatile or permanent memory. The memory 1712 is shown storing an operating system 1714 for controlling the operation of the server system 203. A binary input/output system (BIOS) 1716 for controlling the low-level operation of the server system 203 is also stored in the memory 1712.

The memory 1712 additionally stores program code and data for providing network services that allow the inventory management system 150 to track items picked from inventory locations, placed into inventory locations and/or transitioned, in-facility sellers, in-facility purchase of items, etc. Accordingly, the memory 1712 may store a browser application 1718. The browser application 1718 comprises computer executable instructions, that, when executed by the processor 1700, generate or otherwise obtain configurable markup documents such as Web pages. The browser application 1718 communicates with a data store manager application 1720 to facilitate data exchange between the inventory data store 1715, the user profile data store 1717, the item identifier list data store 1719, and/or the seller data store 1721.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 1715, 1717, 1719, 1721 as needed to execute aspects of the inventory management system 150.

The data stores 1715, 1717, 1719, 1721 can include several separate data tables, databases or other data storage mechanisms and media for storing data relating to a particular aspect. For example, the data stores 1715, 1717, 1719, 1721 illustrated include mechanisms for determining inventory information, user information, in-facility sellers, sellers, etc., which can be used to identify an item picked from an inventory location, placed into an inventory location, in-facility purchases of items, etc. For example, the inventory data store 1715 maintains information about inventory items. The information about inventory items may include the location of the inventory item in the materials handling facility, the seller of the inventory item, characteristics of the inventory item (e.g., size, shape, weight, dimensions, color, hazardous material, fragile), the price of the item, etc. The user data store 1717 may maintain information about users. For example, a user profile and/or user account may be established for each user that maintains information about the user. User information may include, but is not limited to, user identifying information (e.g., images of the user, height of the user, weight of the user), a username and password, user biometrics, purchase history, payment instrument information (e.g., credit card, debit card, check card), purchase limits, and the like. The item identifier list data store 1719 may include, for each user located in the materials handling facility, an item identifier list, such as those illustrated and discussed above with respect to FIGS. 10, 12, and 15. The seller data store 1721 may identify each seller of items within the materials handling facility, the items offered for sale by that seller within that facility, the inventory locations at which items offered for sale by that seller are located, etc.

It should be understood that there can be many other aspects that may be stored in the data stores 1715, 1717, 1719, 1721. The data stores 1715, 1717, 1719, 1721 are operable, through logic associated therewith, to receive instructions from the remote computing resource 203 and obtain, update, or otherwise process data in response thereto.

The memory 1712 may also include the inventory management system 150, discussed above. The inventory management system 150 may be executable by the processor 1700 to implement one or more of the functions of the remote computing resource 203. In one implementation, the inventory management system 150 may represent instructions embodied in one or more software programs stored in the memory 1712. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and inventory management should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 4 through 9, 11, 13, 14, and 16A-16C, orders in which such methods or processes are presented are not intended to be construed as any limitation on the claimed inventions, and any number of the method or process steps or boxes described herein can be omitted as optional or combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
under control of one or more computing systems configured with executable instructions:
generating, with at least one of a plurality of cameras located within a materials handling facility, a plurality of images of an inventory location, wherein the plurality of images include a first image of an object before the object enters the inventory location and a second image of the object after the object is removed from the inventory location;
comparing a first plurality of pixels of the first image with a second plurality of pixels of the second image to determine a first item is included with the object in the second image that is not included with the object in the first image;
in response to determination that the first item is included with the object in the second image, determining a first item pick by a user of the first item from the inventory location;
comparing at least one of an identity of the first item or a feature of the first item with stored inventory item information to determine that the first item is an inventory item associated with the inventory location and offered for sale by a first seller;

in response to determining that the first item is the inventory item, updating an item identifier list corresponding to the user to include a first item identifier of the first item;
subsequent to the first item pick, determining an in-facility purchase of the first item and a second item offered for sale by a second seller, wherein:
the in-facility purchase is between the user and the second seller;
the in-facility purchase includes a payment, by the user to the second seller, of a first purchase price for the first item, a first tax for the first item, a second purchase price for the second item, and a second tax for the second item; and
the second seller is a seller of record of the first item and second item;
subsequent to the in-facility purchase, determining that the user is exiting the materials handling facility; and
in response to determining that the user is exiting the materials handling facility, causing a payment of at least a portion of the first purchase price from the second seller to the first seller.

2. The computer-implemented method of claim 1, further comprising:
generating a unique identifier that corresponds to the user while the user is located in the materials handling facility;
determining that the user prefers to in-facility purchase items within the materials handling facility; and
in response to determining that the user prefers to in-facility purchase items, associating an in-facility purchase identifier with the unique identifier of the user, wherein causing the payment of at least a portion of the first purchase price from the second seller to the first seller is based at least in part on the in-facility purchase identifier.

3. The computer-implemented method of claim 1, wherein the payment by the user is a cash payment.

4. The computer-implemented method of claim 1, further comprising:
detecting, while the user is located in the materials handling facility, a second item pick by the user of a third item located within the materials handling facility and offered for sale by a third seller that is different than the first seller and the second seller;
in response to detecting the second item pick, updating the item identifier list corresponding to the user to include a second item identifier of the third item; and
in response to determining that the user is exiting the materials handling facility:
determining that the third item corresponding to the second item identifier was not included in the in-facility purchase;
charging an account associated with the user for a third purchase price for the third item and a third tax for the third item; and
causing at least a portion of the third purchase price to be paid to the third seller.

5. A computing system, comprising:
a plurality of cameras positioned within a materials handling facility;
one or more processors; and
a memory storing program instructions that, when executed by the one or more processors, cause the one or more processors to at least:
generate, with at least one of the plurality of cameras, a plurality of images of an inventory location, wherein the plurality of images include a first image of an object before the object enters the inventory location and a second image of the object after the object is removed from the inventory location;
compare a first plurality of pixels of the first image with a second plurality of pixels of the second image to determine that a first item is included with the object in the second image that is not included with the object in the first image;
in response to determination that the first item is included with the object in the second image, determine a first item pick by a user of the first item from the inventory location;
compare at least one of an identity of the first item or a feature of the first item with stored inventory item information to determine that the first item is an inventory item associated with the inventory location and offered for sale by a first seller;
in response to determination that the first item is the inventory item, update an item identifier list corresponding to the user to include a first item identifier of the first item;
detect, while the user is located in the materials handling facility, a second item pick by the user of a second item located within the materials handling facility and offered for sale by a second seller;
in response to detection of the second item pick, update the item identifier list corresponding to the user to include a second item identifier of the second item;
subsequent to the first item pick and the second item pick, determine that the user is exiting the materials handling facility; and
in response to determination that the user is exiting the materials handling facility:
determine that the first item was not included in an in-facility purchase between the user and a third seller within the materials handling facility;
determine that the second item was included in the in-facility purchase;
charge a user account associated with the user for a first purchase price for the first item, without charging the user account for a second purchase price for the second item;
cause at least a portion of the first purchase price to be assigned to the first seller; and
cause at least a portion of a payment that was made by the user to the third seller as part of the in-facility purchase to be paid by the third seller to the second seller.

6. The computing system of claim 5, wherein the program instructions that, when executed by the one or more processors, further cause the one or more processors to at least:
determine that the user has been authenticated such that the user account corresponding to the user has been identified;
generate a unique identifier corresponding to the user; and
associate the user account with the unique identifier.

7. The computing system of claim 5, wherein the program instructions that, when executed by the one or more processors, further cause the one or more processors to at least:
determine the in-facility purchase of the second item between the user and the third seller, wherein the in-facility purchase included a purchase, by the user and from the third seller, of the second item of the second seller and a third item offered for sale for the third seller; and update the item identifier list to indicate that the second item has been in-facility purchased.

8. The computing system of claim 7, wherein the program instructions that, when executed by the one or more processors to determine that the second item was included in the in-facility purchase, further include instructions that, when executed by the one or more processors, further cause the one or more processors to at least:
   determine, based at least in part on the indication that the second item was in-facility purchased, that the second item was included in the in-facility purchase between the user and the third seller.

9. The computing system of claim 5, wherein the program instructions that, when executed by the one or more processors, further cause the one or more processors to at least:
   cause an update to an inventory count of the first seller to indicate that the first item has been transitioned from the first seller to the user and that the first seller is a seller of record of the first item.

10. The computing system of claim 5, wherein the program instructions that, when executed by the one or more processors, further cause the one or more processors to at least:
    cause a first update to a first inventory count of the second seller to indicate that the second item has been transitioned from the second seller to the third seller and that the third seller is a seller of record of the second item.

11. The computing system of claim 5, wherein the at least a portion of the payment that is paid by the third seller to the second seller is a tax-exempt payment between the third seller and the second seller.

12. The computing system of claim 5, wherein the user has consumed at least one of the first item or the second item prior to exiting the materials handling facility.

13. A method, comprising:
    generating, with at least one of a plurality of cameras located within a materials handling facility, a plurality of images of an inventory location, wherein the plurality of images include a first image of an object before the object enters the inventory location and a second image of the object after the object is removed from the inventory location;
    comparing a first plurality of pixels of the first image with a second plurality of pixels of the second image to determine a first item is included with the object in the second image that is not included with the object in the first image;
    in response to determination that the first item is included with the object in the second image, determining a first item pick by a user of the first item from the inventory location;
    comparing at least one of an identity of the first item or a feature of the first item with stored inventory item information to determine that the first item is an inventory item associated with the inventory location and offered for sale by a first seller;
    associating the first item with the user;
    determining an in-facility purchase between the user and a second seller for the first item, wherein:
       the in-facility purchase includes a payment, by the user and to the second seller, of at least a first purchase price for the first item; and
       the second seller is a seller of record of the first item;
    subsequent to the in-facility purchase, determining that the user is exiting the materials handling facility; and
    in response to determining that the user is exiting the materials handling facility, causing a payment of at least a portion of the first purchase price from the second seller to the first seller.

14. The method of claim 13, wherein causing the payment of the at least a portion of the first purchase price from the second seller to the first seller is in response to determining that the user is exiting the materials handling facility.

15. The method of claim 13, wherein the in-facility purchase further includes a second payment, by the user and to the second seller, of at least a second purchase price for a second item offered for sale by the second seller.

16. The method of claim 13, further comprising:
    associating, while the user is located in the materials handling facility, a second item with the user, wherein the second item is offered for sale within the materials handling facility by the first seller;
    determining that the in-facility purchase did not include the second item; and
    in response to determining that the user is exiting the materials handling facility, charging, a user account associated with the user, a second purchase price for the second item.

17. The method of claim 13, wherein the payment of at least a portion of the first purchase price from the second seller to the first seller is at least one of:
    less than the first purchase price;
    equal to the first purchase price; or
    greater than the first purchase price.

18. The method of claim 13, further comprising:
    in response to determining the in-facility purchase:
       providing, to the second seller, an indication of the first purchase price corresponding to the first item.

19. The method of claim 13, wherein the user may in-facility purchase, from the second seller, any number of a plurality of items available within the materials handling facility, wherein the plurality of items available within the materials handling facility are each offered for sale by at least one of a plurality of sellers.

20. The method of claim 13, further comprising:
    maintaining an indication that the first item picked by the user is offered for sale by the first seller.

21. The method of claim 13, wherein the object is a hand of the user.

* * * * *